United States Patent
Desbois et al.

(10) Patent No.: US 12,077,631 B2
(45) Date of Patent: Sep. 3, 2024

(54) BULK POLYMERISATION OF POLYOXAZOLIDONE

(71) Applicant: BASF SE, Ludwigshafen am Rhein (DE)

(72) Inventors: Philippe Desbois, Ludwigshafen (DE); Hans-Josef Thomas, Ludwigshafen am Rhein (DE)

(73) Assignee: BASF SE, Ludwigshafen am Rhein (DE)

(*) Notice: Subject to any disclaimer, the term of this patent is extended or adjusted under 35 U.S.C. 154(b) by 717 days.

(21) Appl. No.: 17/260,422

(22) PCT Filed: Jul. 17, 2019

(86) PCT No.: PCT/EP2019/069202
§ 371 (c)(1),
(2) Date: Jan. 14, 2021

(87) PCT Pub. No.: WO2020/016276
PCT Pub. Date: Jan. 23, 2020

(65) Prior Publication Data
US 2021/0253782 A1   Aug. 19, 2021

(30) Foreign Application Priority Data
Jul. 18, 2018 (EP) ................... 18184167

(51) Int. Cl.
*C08G 18/00* (2006.01)
*C08G 18/76* (2006.01)

(52) U.S. Cl.
CPC ....... *C08G 18/7671* (2013.01); *C08G 18/003* (2013.01); *C08G 18/7621* (2013.01)

(58) Field of Classification Search
CPC .............................................. C08G 18/003
See application file for complete search history.

(56) References Cited

U.S. PATENT DOCUMENTS

| | | | |
|---|---|---|---|
| 3,198,851 A * | 8/1965 | Hoy .................. | C08L 27/06 525/111 |
| 3,442,974 A * | 5/1969 | Bremmer ............ | C08L 63/00 528/48 |
| 5,112,932 A | 5/1992 | Koenig et al. | |
| 2014/0121299 A1 | 5/2014 | Feng et al. | |
| 2015/0291726 A1 | 10/2015 | Mueller et al. | |
| 2017/0088659 A1 | 3/2017 | Müller et al. | |
| 2018/0051119 A1 | 2/2018 | Holtgrewe et al. | |
| 2019/0359757 A1 * | 11/2019 | Thomas ............. | C08G 18/581 |
| 2020/0385507 A1 * | 12/2020 | Koopmans ......... | C08G 18/0852 |

FOREIGN PATENT DOCUMENTS

| | | |
|---|---|---|
| DE | 102 02 838 A1 | 8/2003 |
| DE | 10 2014 226 838 A1 | 6/2016 |
| EP | 3260481 | 12/2017 |
| WO | WO 2014/076024 A1 | 5/2014 |
| WO | WO 2015/173110 A1 | 11/2015 |
| WO | WO 2015/173111 A1 | 11/2015 |
| WO | WO 2018/149844 A1 | 8/2018 |

OTHER PUBLICATIONS

International Search Report issued Oct. 14, 2019 in PCT/EP2019/069202, 2 pages.
International Preliminary Report on Patentability issued Mar. 30, 2020 in PCT/EP2019/069202 (submitting English translation only), 5 pages.
Gou Bao-Chun, et al., "Progress in study of co-reaction mechanism of cyanate ester-epoxy blends", College of Materials Science and Engineering, South China University of Technology, Guangzhou 510640, China, 2004, with English abstract, pp. 53-57.
Wasserscheid, et al., "*Ionische Flüssigkeiten—neue "Lösungen" für die Übergangsmetallkatalyse*," Angew. Chem. 2000, 112, 3926-3945.

* cited by examiner

*Primary Examiner* — Michael L Leonard
(74) *Attorney, Agent, or Firm* — Grüneberg and Myers PLLC

(57) ABSTRACT

A process for preparing a thermoplastic polymer may involve reacting at least components (i) to (ii): a polyisocyanate composition including at least one diisocyanate (i); an epoxide composition comprising at least one diepoxide (ii); in the presence of a catalyst composition (iii); where epoxide composition (ii) and catalyst composition (iii) are initially charged as a mixture at a temperature in a first temperature range ($T_1$); the polyisocyanate composition (i) is at least partially added while maintaining a temperature in the first temperature range $T_1$; the temperature is raised to a temperature in a final temperature range ($T_f$); and the remaining polyisocyanate composition (i) is added in the final temperature range. A thermoplastic polymer obtainable by such a process may be used, e.g., for producing a fiber or a shaped body by injection molding, calendering, powder sintering, laser sintering, melt pressing, or extrusion, or as modifier for thermoplastic material.

22 Claims, No Drawings

BULK POLYMERISATION OF POLYOXAZOLIDONE

The present invention relates to a process for preparing a thermoplastic polymer by reacting at least components (i) to (ii): a polyisocyanate composition comprising at least one diisocyanate (i); an epoxide composition comprising at least one diepoxide (ii); in the presence of a catalyst composition (iii); where epoxide composition (ii) and catalyst composition (iii) are initially charged as a mixture at a temperature in a first temperature range ($T_1$) (a); the polyisocyanate composition (i) is at least partially added while maintaining a temperature in the first temperature range $T_1$ (b); the temperature is raised to a temperature in a final temperature range ($T_f$) (c); and the remaining polyisocyanate composition (i) is added in the final temperature range (d). The thermoplastic polymer obtained in this way and based on diisocyanate and diepoxide is also referred to as a polyoxazolidone.

The preparation of polyoxazolidones based on diisocyanate and diepoxide is known in principle. In this case, the focus is mostly on crosslinked structures as are mentioned by way of example in DE 10 2014 226 838 A1. Here, a series of side reactions occur starting from the isocyanate and epoxide, which have an adverse effect on the thermoplastic properties of the polyoxazolidones.

The synthesis of linear polyoxazolidones is described in documents WO 2015/173111 A1, WO 2015/173110 A1, US 2014/0121299 and WO 2014/076024 A1. However, the preparation of thermoplastic polyoxazolidones in which the side reactions occur only to a minor degree in order thus not to adversely affect the properties, especially also the thermoplastic property, of the polyoxazolidone was problematic. One possibility for improving product properties, especially also the thermoplastic property, of polyoxazolidones was provided by preparing the polyoxazolidone with a suitable catalyst that may also be present in the end product—the catalyst in this case according to PCT/EP2018/053612 was an ionic liquid. According to PCT/EP2018/053612, synthesis is performed by, for example, in a first step dissolving the epoxide and the catalyst in a solvent and heating to reaction temperature, where the reaction temperature is preferably in a range of 140° C. to 220° C. The isocyanate is then slowly metered in under protective gas while maintaining the reaction temperature. The described process provides linear polyoxazolidones, though it has been found that the polymers obtained have increased polydispersity; furthermore, the workup of the polymer was more complicated, for example solvent residues were able to be removed only in a complicated manner.

It is thus an object of the present invention to provide a preparation process with which the abovementioned disadvantages can be avoided, in particular relatively high molecular weights and relatively low polydispersities are to be achieved, preferably without the use of solvents in the procedure.

The object is achieved by a process for preparing a thermoplastic polymer by reacting at least components (i) to (ii)
  i) a polyisocyanate composition comprising at least one diisocyanate;
  ii) an epoxide composition comprising at least one diepoxide; in the presence of a catalyst composition (iii); where
  a) epoxide composition (ii) and catalyst composition (iii) are initially charged as a mixture at a temperature in a first temperature range ($T_1$);
  b) the polyisocyanate composition (i) is at least partially added while maintaining a temperature in the first temperature range $T_1$;
  c) the temperature is raised to a temperature in a final temperature range ($T_f$);
  d) the remaining polyisocyanate composition (i) is added in the final temperature range.

The polymers obtained (polyoxazolidones) have a relatively high molecular weight in respect of both $M_n$ and $M_w$, and also a relatively low polydispersity. In particular, the number-average molar mass $M_n$ is greater than 10 000 g/mol and the polydispersity is less than 4.

Temperature Ranges

According to (c), the temperature is raised to a temperature in a final temperature range ($T_f$). The final temperature range $T_f$ preferably comprises a second temperature range $T_2$ and a third temperature range $T_3$, wherein the third temperature range $T_3$ is above the second temperature range $T_2$ and the second temperature range $T_2$ is above the first temperature range $T_1$. Preferentially, the final temperature range $T_f$ is >180 to 250° C., preferably >170 to 250° C., further preferably >165 to 250° C., wherein preferentially the second temperature range $T_2$ is >180 to 200° C., preferably >170 to 200° C., further preferably >165 to 200° C., and the third temperature range $T_3$ is >200 to 250° C., preferably >200 to 230° C.

According to (a), epoxide composition (ii) and catalyst composition (iii) are initially charged as a mixture at a temperature in a first temperature range ($T_1$). Preferentially, the first temperature range $T_1$ is 140 to 180° C., preferably 150 to 170° C., further preferably 155 to 165° C.

According to (b), the polyisocyanate composition (i) is at least partially added while maintaining a temperature in the first temperature range $T_1$. In the first temperature range $T_1$ according to (b) preferably 80% to 95% by weight of the polyisocyanate composition (i), based on the total amount of the polyisocyanate composition (i), is added.

"While maintaining a temperature in the first range T1" means that the temperature can deviate by up to +/−10° C., preferably by +/−5° C., further preferably by +/−3° C., from the temperature set in (a), with the temperature range $T_1$ nonetheless being complied with, i.e. the temperature remains in step (b) preferentially in the temperature range $T_1$ of 140 to 180° C., preferably in the range of 150 to 170° C., further preferably in the range of 155 to 165° C.

According to (d), the remaining polyisocyanate composition (i) is added in the final temperature range. In the final temperature range $T_f$ preferably 5% to 20% by weight of the polyisocyanate composition (i), based on the total amount of the polyisocyanate composition (i), is added, wherein preferably in the second temperature range $T_2$ 5% to 20% by weight of the polyisocyanate composition (i), and in the third temperature range $T_3$ optionally 0% to 10% by weight, preferably 0% by weight, of the polyisocyanate composition (i), in each case based on the total amount of the polyisocyanate composition (i), are added.

The addition of the polyisocyanate composition (i) in (b) and (d) is not subject to any restrictions—it can be performed continuously with an identical amount per period of time, continuously with a varying amount per period of time or discontinuously. The addition of the polyisocyanate composition (i) in (b) and (d) is preferably performed continuously with an identical amount per period of time.

Polyisocyanate Composition

According to (i), the polyisocyanate composition comprises at least one diisocyanate.

"At least one diisocyanate" is understood in the present case to mean both a single substance and a mixture of substances, preferably selected from the following list. The diisocyanates are selected from the group of the aliphatic, cycloaliphatic, araliphatic and aromatic isocyanates, which are further preferably selected from the group of tri-, tetra-, penta-, hexa-, hepta- and/or octamethylene diisocyanate, 2-methylpentamethylene 1,5-diisocyanate, 2-ethylbutylene 1,4-diisocyanate, pentamethylene 1,5-diisocyanate, butylene 1,4-diisocyanate, 1-isocyanato-3,3,5-trimethyl-5-isocyanatomethylcyclohexane (isophorone diisocyanate, IPDI), 1,4- and/or 1,3-bis(isocyanatomethyl)cyclohexane (HXDI), cyclohexane 1,4-diisocyanate, 1-methylcyclohexane 2,4- and/or 2,6-diisocyanate, dicyclohexylmethane 4,4'-, 2,4'- and/or 2,2'-diisocyanate, diphenylmethane 2,2'-, 2,4'- and/or 4,4'-diisocyanate (MDI), naphthylene 1,5-diisocyanate (NDI), tolylene 2,4- and/or 2,6-diisocyanate (TDI), diphenylmethane diisocyanate, dimethyl diphenyl 3,3'-diisocyanate, diphenylethane 1,2-diisocyanate, dicyclohexylmethane 4,4'-, 2,4'- and 2,2'-diisocyanate (H12 MDI), praraphenylene 2,4-diisocyanate (PPDI), tetramethylenexylene 2,4-diisocyanate (TMXDI). Aromatic diisocyanates selected from the above list are preferred. The isocyanate is further preferably selected from the group of tolylene diisocyanate (TDI), diphenylmethane diisocyanate (MDI) and naphthylene 1,5-diisocyanate (NDI). Tolylene diisocyanate (TDI) or diphenylmethane diisocyanate (MDI) is very particularly preferred.

According to one embodiment, the polyisocyanate composition (i) does not comprise any isocyanate having a functionality of greater than 2.0. This means that the polyisocyanate composition (i) only comprises diisocyanates having a functionality of 2.0, where this preferably comprises diisocyanates having a functionality in the range of 1.95 to 2.05. The polyisocyanate composition (i) further preferably is composed of at least 98% by weight of the at least one diisocyanate, respectively based on the total weight of the polyisocyanate composition (i).

The content of isocyanate groups is determined in accordance with DIN EN ISO 14896.

Epoxide Composition

According to (ii), the epoxide composition comprises at least one diepoxide.

"At least one diepoxide" is understood in the present case to mean both a single substance and a mixture of substances. The epoxide composition (ii) preferably does not comprise any epoxide having a functionality of greater than 2.0. This means that the epoxide composition (ii) only comprises diepoxides having a functionality of 2.0, where this preferably comprises diepoxides having a functionality in the range of 1.95 to 2.05. In one preferred embodiment, the epoxide composition (ii) is composed of at least 98% by weight of the at least one diepoxide, respectively based on the total weight of the epoxide composition (ii).

These diepoxides may in this case be either saturated or unsaturated, aliphatic, cycloaliphatic, aromatic or heterocyclic. They may furthermore comprise those substituents that do not cause any interfering side reactions under the reaction conditions, for example alkyl or aryl substituents, ether groups and the like.

The diepoxides are preferably polyglycidyl ethers based on dihydric alcohols, phenols, hydrogenation products of these phenols and/or on novolaks. Novolaks are products of reaction of phenols with aldehydes, especially formaldehyde, in the presence of acidic catalysts, particularly preferred in this case are the diglycidyl ethers. However, diepoxides based on other structures that do not comprise any ether groups are also possible.

Other preferred diepoxides are based on diglycidyl ethers of natural raw materials, preferably cardanol. One typical example of such a product is Cardolite NC 514 (Cardolite). The advantage with this epoxide is the relatively long alkyl chain between the aromatic systems which leads to a greater flexibility of the polymers produced therefrom. The advantages of aliphatic structural elements are especially effective in combination with aromatic diglycidyl ethers. Therefore, diepoxides based on aliphatic diglycidyl ethers in combination with aromatic diglycidyl ethers are particularly preferred.

The epoxide equivalent weights of these epoxide compounds are preferably between 100 and 5000, especially between 150 and 500. The epoxide equivalent weight of a substance is defined here as that amount of the substance (in grams) that comprises 1 mol of oxirane rings. In order to characterize the content of oxirane groups ("epoxide groups") in compounds, an epoxide titration is customarily conducted with a 0.1 N solution of perchloric acid in glacial acetic acid (cf. DIN EN ISO 3001). The epoxide number obtained here (% EpO) indicates how many grams of oxirane oxygen are present in 100 grams of a sample. Crystal violet is used as indicator. Determination requires the absence of water, bases and amines. The epoxide content % EpO is calculated, from the consumption in ml of 0.1 N perchloric acid during the titration (x), the consumption in ml of 0.1 N perchloric acid in the blank sample (y) and the initial mass of the sample to be investigated in grams (E), as follows: % EpO=[(x-y)+0.160]/E. The epoxide equivalent weight (EEW) is in turn calculated from this according to the following formula: EEW=1600/% EpO, where the units of EEW are g/eq.

The following compounds may preferably be considered as polyhydric phenols: resorcinol, hydroquinone, 2,2-bis(4-hydroxyphenyl)propane (bisphenol A), isomeric mixtures of dihydroxydiphenylmethane (bisphenol F), tetrabromobisphenol A, 4,4'-dihydroxydiphenylcyclohexane, 4,4'-dihydroxy-3,3-dimethyldiphenylpropane, 4,4'-dihydroxydiphenyl, 4,4'-dihydroxybenzophenol, bis(4-hydroxyphenyl)-1,1-ethane, bis(4-hydroxyphenyl)-1,1-isobutane, bis(4-hydroxyphenyl)methane, bis(4-hydroxyphenyl) ether, bis(4-hydroxyphenyl)sulfone, and also the chlorination and bromination products of the abovementioned compounds; bisphenol A is very particularly preferred here. Examples of commercial products for bisphenol A diglycidyl ethers are DER 332, DER 331, or DER 330 from DOW U.S.A. or Epilox A18-00 from Leuna Harze, Germany.

Catalyst

Polyisocyanate composition according to (i) and epoxide composition according to (ii) are reacted in the presence of a catalyst composition (iii).

The catalysts used for preparing the thermoplastic polymer are preferably ionic liquids. Ionic liquids are organic salts whose ions hinder the formation of a stable crystal lattice through charge delocalization and steric effects. Just a low amount of thermal energy is therefore sufficient to overcome the lattice energy and break up the solid crystal structure.

The cations of the ionic liquid are preferably alkylated and further preferably selected from the following group: imidazolium, pyridinium, pyrrolidinium, guanidinium, uronium, thiouronium, piperidinium, morpholinium, ammonium and phosphonium. The anions in the ionic liquid are preferably halides or complex ions preferably selected from the group: tetrafluoroborate, trifluoroacetate, triflate, hexafluorophosphate, phosphinate and tosylate. In another preferred embodiment, the anions are organic ions, preferably imides or amides.

Ionic liquids within the meaning of the present invention are preferably salts of the general formula (A) salts of the general formula (I)

in which n is 1, 2, 3 or 4, $[A]^+$ is a quaternary ammonium cation, an oxonium cation, a sulfonium cation or a phosphonium cation and $[Y]^{n-}$ is a monovalent, divalent, trivalent or tetravalent anion; or (B) mixed salts of the general formulae (II)

 (IIa), where $n=2$;

 (IIb), where $n=3$; or

 (IIc), where $n=4$ and where $[A^1]^+$, $[A^2]^+$, $[A^3]^+$ and $[A^4]^+$ independently of one another are selected from the groups stated for $[A]^+$ and $[Y]^{n-}$ has the meaning stated under (A); or (C) mixed salts of the general formulae (III)

 (IIIa), where $n=4$;

 (IIIb), where $n=4$;

 (IIIc), where $n=4$;

 (IIId), where $n=3$;

 (IIIe), where $n=3$;

 (IIIf), where $n=2$;

 (IIIg), where $n=4$;

 (IIIh), where $n=4$;

 (IIIi), where $n=4$; or

 (IIIj), where $n=3$ and where $[A^1]^+$, $[A^2]^+$ and $[A^3]^+$ independently of one another are selected from the groups stated for $[A]^+$, $[Y]^{n-}$ has the meaning stated under (A) and $[M^1]^+$, $[M^2]^+$, $[M^3]^+$ are monovalent metal cations, $[M^4]^{2+}$ are divalent metal cations and $[M^5]^{3+}$ are trivalent metal cations.

Compounds suitable for forming the cation $[A]^+$ of ionic liquids are known for example from DE 102 02 838 A[1]. Such compounds may thus comprise oxygen, phosphorus, sulfur or especially nitrogen atoms, for example at least one nitrogen atom, preferably 1-10 nitrogen atoms, particularly preferably 1-5, very particularly preferably 1-3 and especially 1-2 nitrogen atoms. Further heteroatoms such as oxygen, sulfur or phosphorus atoms can also optionally be present. The nitrogen atom is a suitable carrier of the positive charge in the cation of the ionic liquid, from which a proton or an alkyl radical can then migrate in equilibrium to the anion to produce an electrically neutral molecule.

If the nitrogen atom is the carrier of the positive charge in the cation of the ionic liquid, a cation can firstly be produced by quaternization of the nitrogen atom of, for instance, an amine or nitrogen heterocycle in the synthesis of the ionic liquids. Quaternization can be effected by alkylation of the nitrogen atom. Depending on the alkylating reagent used, salts having different anions are obtained. In cases in which it is not possible to form the desired anion in the quaternization alone, this can be carried out in a further synthesis step. Starting from, for example, an ammonium halide, the halide can be reacted with a Lewis acid to form a complex anion from halide and Lewis acid. As an alternative, replacement of a halide ion by the desired anion is possible. This can be effected by addition of a metal salt with precipitation of the metal halide formed, by means of an ion exchanger or by displacement of the halide ion by a strong acid (with liberation of the hydrohalic acid). Suitable processes are described for example in Angew. Chem. 2000, 112, pp 3926-3945 and the literature cited therein.

Suitable alkyl radicals with which the nitrogen atom in the amines or nitrogen heterocycles by way of example can be quaternized are $C_1$-$C_{18}$-alkyl, preferably $C_1$-$C_{10}$-alkyl, particularly preferably $C_1$-$C_6$-alkyl and very particularly preferably methyl. The alkyl group can be unsubstituted or have one or more identical or different substituents.

Preference is given to those compounds comprising at least one five- to six-membered heterocycle, especially a five-membered heterocycle, which has at least one nitrogen atom and optionally an oxygen or sulfur atom, particular preference is given to those compounds comprising at least one five- to six-membered heterocycle which has one, two or three nitrogen atoms and a sulfur or an oxygen atom, very particular preference is given to those having two nitrogen atoms. Further preference is given to aromatic heterocycles.

Particularly preferred compounds are those having a molar mass below 1000 g/mol, very particularly preferably below 500 g/mol.

Furthermore, preference is given to those cations selected from the compounds of the formulae (IVa) to (IVx3),

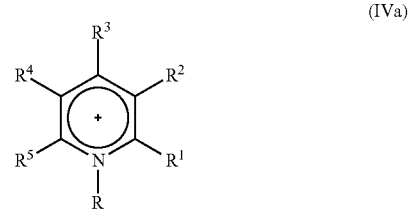 (IVa)

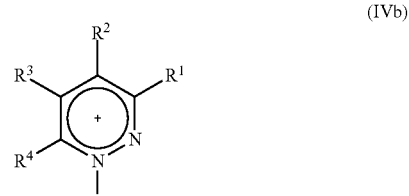 (IVb)

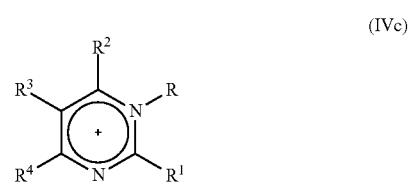 (IVc)

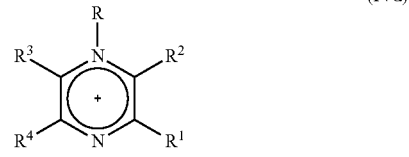 (IVd)

-continued
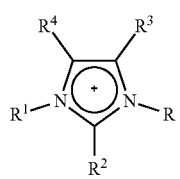
(IVe)
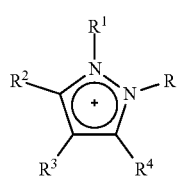
(IVf)
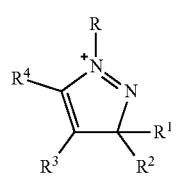
(IVg)
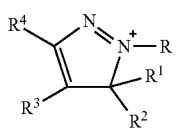
(IVg')
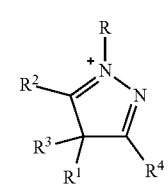
(IVh)
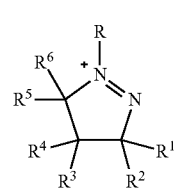
(IVi)
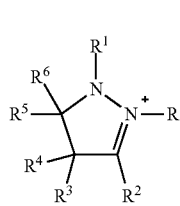
(IVj)
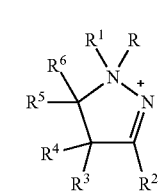
(IVj')
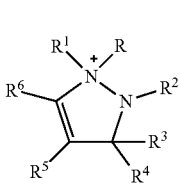
(IVk)
-continued
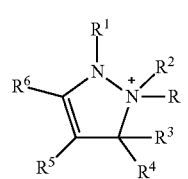
(IVk')
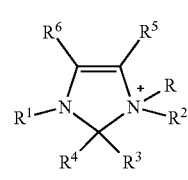
(IVl)
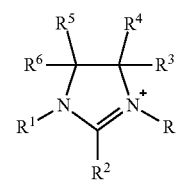
(IVm)
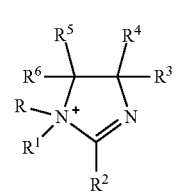
(IVm')
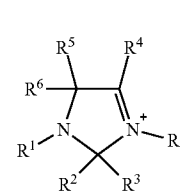
(IVn)
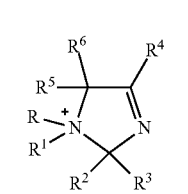
(IVn')
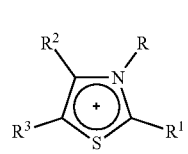
(IVo)
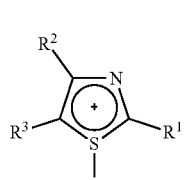
(IVo')
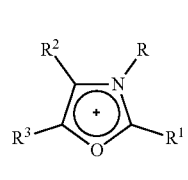
(IVp)

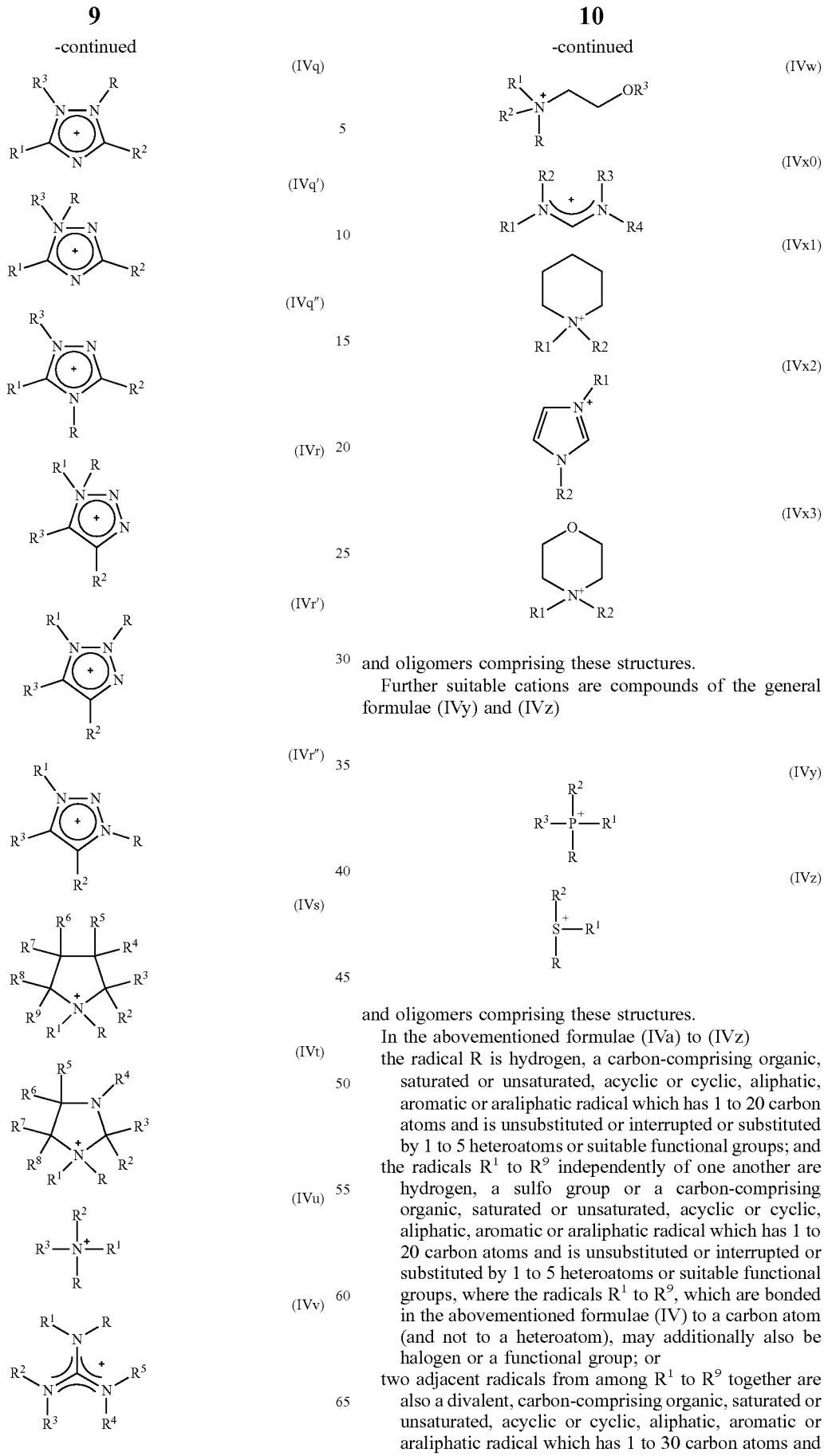

and oligomers comprising these structures.

Further suitable cations are compounds of the general formulae (IVy) and (IVz)

and oligomers comprising these structures.

In the abovementioned formulae (IVa) to (IVz)
the radical R is hydrogen, a carbon-comprising organic, saturated or unsaturated, acyclic or cyclic, aliphatic, aromatic or araliphatic radical which has 1 to 20 carbon atoms and is unsubstituted or interrupted or substituted by 1 to 5 heteroatoms or suitable functional groups; and
the radicals $R^1$ to $R^9$ independently of one another are hydrogen, a sulfo group or a carbon-comprising organic, saturated or unsaturated, acyclic or cyclic, aliphatic, aromatic or araliphatic radical which has 1 to 20 carbon atoms and is unsubstituted or interrupted or substituted by 1 to 5 heteroatoms or suitable functional groups, where the radicals $R^1$ to $R^9$, which are bonded in the abovementioned formulae (IV) to a carbon atom (and not to a heteroatom), may additionally also be halogen or a functional group; or
two adjacent radicals from among $R^1$ to $R^9$ together are also a divalent, carbon-comprising organic saturated or unsaturated, acyclic or cyclic, aliphatic, aromatic or araliphatic radical which has 1 to 30 carbon atoms and is unsubstituted or interrupted or substituted by 1 to 5 heteroatoms or suitable functional groups.

Possible heteroatoms in the definition of the radicals R and $R^1$ to $R^9$ are in principle all heteroatoms capable in a formal sense of replacing a —$CH_2$—, a —CH=, a —C= or a =C= group. If the carbon-comprising radical comprises heteroatoms, preference is given to oxygen, nitrogen, sulfur, phosphorus and silicon. Preferred groups especially include —O—, —S—, —SO—, —$SO_2$—, —NR'—, —N=, —PR'—, —$PR'_2$ and —$SiR'_2$—, where the radicals R' are the remaining portion of the carbon-comprising radical. In cases in which the radicals $R^1$ to $R^9$ in the abovementioned formulae (IV) are bonded to a carbon atom (and not to a heteroatom), they can also be bonded directly via the heteroatom.

Possible functional groups are in principle all functional groups which can be bonded to a carbon atom or a heteroatom. Suitable examples are —$NR_2$' and —CN (cyano). Functional groups and heteroatoms may also be directly adjacent, and so combinations of a plurality of adjacent atoms, for instance —O— (ether), —S— (thioether), —COO— (ester) or —CONR'— (tertiary amide), are encompassed as well, for example di($C_1$-$C_4$-alkyl)amino, $C_1$-$C_4$-alkyloxycarbonyl or $C_1$-$C_4$-alkyloxy. The radicals R' are the remaining portion of the carbon-comprising radical.

Preferred halogens are fluorine, chlorine, bromine and iodine.

Preferably, the radical R is unbranched or branched $C_1$-$C_{18}$-alkyl which has 1 to 20 carbon atoms in total and is unsubstituted or mono- to polysubstituted by halogen, phenyl, cyano, such as for example methyl, ethyl, 1-propyl, 2-propyl, 1-butyl, 2-butyl, 2-methyl-1-propyl (isobutyl), 2-methyl-2-propyl (tert-butyl), 1-pentyl, 2-pentyl, 3-pentyl, 2-methyl-1-butyl, 3-methyl-1-butyl, 2-methyl-2-butyl, 3-methyl-2-butyl, 2,2-dimethyl-1-propyl, 1-hexyl, 2-hexyl, 3-hexyl, 2-methyl-1-pentyl, 3-methyl-1-pentyl, 4-methyl-1-pentyl, 2-methyl-2-pentyl, 3-methyl-2-pentyl, 4-methyl-2-pentyl, 2-methyl-3-pentyl, 3-methyl-3-pentyl, 2,2-dimethyl-1-butyl, 2,3-dimethyl-1-butyl, 3,3-dimethyl-1-butyl, 2-ethyl-1-butyl, 2,3-dimethyl-2-butyl, 3,3-dimethyl-2-butyl, 1-heptyl, 1-octyl, 1-nonyl, 1-decyl, 1-undecyl, 1-dodecyl, 1-tetradecyl, 1-hexadecyl, 1-octadecyl, benzyl, 3-phenylpropyl, 2-cyanoethyl, 2-(methoxycarbonyl)ethyl, 2-(ethoxycarbonyl)ethyl, 2-(n-butoxycarbonyl)ethyl, trifluoromethyl, difluoromethyl, fluoromethyl, pentafluoroethyl, heptafluoropropyl, heptafluoroisopropyl, nonafluorobutyl, nonafluoroisobutyl, undecylfluoropentyl and undecylfluoroisopentyl;

glycols, butylene glycols and oligomers thereof having 1 to 100 units and a $C_1$-$C_8$-alkyl as end group, such as for example $R^A$O—(CHR$^B$—$CH_2$—O)$_n$—CHR$^B$—$CH_2$— or $R^A$O—($CH_2CH_2CH_2CH_2$O)$_n$—$CH_2CH_2CH_2CH_2$O— where $R^A$ and $R^B$ are preferably methyl or ethyl and n is preferably 0 to 3, especially 3-oxabutyl, 3-oxapentyl, 3,6-dioxaheptyl, 3,6-dioxaoctyl, 3,6,9-trioxadecyl, 3,6,9-trioxaundecyl, 3,6,9,12-tetraoxatridecyl and 3,6,9,12-tetraoxatetradecyl;

vinyl;

1-propen-1-yl, 1-propen-2-yl and 1-propen-3-yl; and

N,N-di-$C_1$-$C_8$-alkylamino, such as for example N,N-dimethylamino and N,N-diethylamino.

The radical R particularly preferably is an unbranched and unsubstituted $C_1$-$C_{18}$-alkyl, such as for example methyl, ethyl, 1-propyl, 1-butyl, 1-pentyl, 1-hexyl, 1-heptyl, 1-octyl, 1-decyl, 1-dodecyl, 1-tetradecyl, 1-hexadecyl, 1-octadecyl, especially methyl, ethyl, 1-butyl and 1-octyl, and also $CH_3$O—($CH_2CH_2$O)$_n$-$CH_2CH_2$— and $CH_3CH_2$O—($CH_2CH_2$O)$_n$-$CH_2CH_2$— where n is 0 to 3.

Preferably, the radicals $R^1$ to $R^9$ independently of one another are hydrogen;

halogen;

a suitable functional group;

$C_1$-$C_{18}$-alkyl optionally substituted by suitable functional groups, aryl, alkyl, aryloxy, alkyloxy, halogen, heteroatoms and/or heterocycles and/or interrupted by one or more oxygen and/or sulfur atoms and/or one or more substituted or unsubstituted imino groups;

$C_2$-$C_{18}$-alkenyl optionally substituted by suitable functional groups, aryl, alkyl, aryloxy, alkyloxy, halogen, heteroatoms and/or heterocycles and/or interrupted by one or more oxygen and/or sulfur atoms and/or one or more substituted or unsubstituted imino groups;

$C_6$-$C_{12}$-aryl optionally substituted by suitable functional groups, aryl, alkyl, aryloxy, alkyloxy, halogen, heteroatoms and/or heterocycles;

$C_5$-$C_{12}$-cycloalkyl optionally substituted by suitable functional groups, aryl, alkyl, aryloxy, alkyloxy, halogen, heteroatoms and/or heterocycles;

$C_5$-$C_{12}$-cycloalkenyl optionally substituted by suitable functional groups, aryl, alkyl, aryloxy, alkyloxy, halogen, heteroatoms and/or heterocycles; or a five- to six-membered heterocycle which has oxygen, nitrogen and/or sulfur atoms and is optionally substituted by suitable functional groups, aryl, alkyl, aryloxy, alkyloxy, halogen, heteroatoms and/or heterocycles; or two adjacent radicals together with the atoms to which they are bonded are an unsaturated, saturated or aromatic ring which is optionally substituted by suitable functional groups, aryl, alkyl, aryloxy, alkyloxy, halogen, heteroatoms and/or heterocycles and is optionally interrupted by one or more oxygen and/or sulfur atoms and/or one or more substituted or unsubstituted imino groups.

$C_1$-$C_{18}$-alkyl optionally substituted by suitable functional groups, aryl, alkyl, aryloxy, alkyloxy, halogen, heteroatoms and/or heterocycles is preferably methyl, ethyl, 1-propyl, 2-propyl, 1-butyl, 2-butyl, 2-methyl-1-propyl (isobutyl), 2-methyl-2-propyl (tert-butyl), 1-pentyl, 2-pentyl, 3-pentyl, 2-methyl-1-butyl, 3-methyl-1-butyl, 2-methyl-2-butyl, 3-methyl-2-butyl, 2,2-dimethyl-1-propyl, 1-hexyl, 2-hexyl, 3-hexyl, 2-methyl-1-pentyl, 3-methyl-1-pentyl, 4-methyl-1-pentyl, 2-methyl-2-pentyl, 3-methyl-2-pentyl, 4-methyl-2-pentyl, 2-methyl-3-pentyl, 3-methyl-3-pentyl, 2,2-dimethyl-1-butyl, 2,3-dimethyl-1-butyl, 3,3-dimethyl-1-butyl, 2-ethyl-1-butyl, 2,3-dimethyl-2-butyl, 3,3-dimethyl-2-butyl, heptyl, octyl, 2-ethylhexyl, 2,4,4-trimethylpentyl, 1,1,3,3-tetramethylbutyl, 1-nonyl, 1-decyl, 1-undecyl, 1-dodecyl, 1-tridecyl, 1-tetradecyl, 1-pentadecyl, 1-hexadecyl, 1-heptadecyl, 1-octadecyl, cyclopentylmethyl, 2-cyclopentylethyl, 3-cyclopentylpropyl, cyclohexylmethyl, 2-cyclohexylethyl, 3-cyclohexylpropyl, benzyl (phenylmethyl), dlphenylmethyl (benzhydryl), triphenylmethyl, 1-phenylethyl, 2-phenylethyl, 3-phenylpropyl, α,α-dimethylbenzyl, p-tolylmethyl, 1-(p-butylphenyl)ethyl, p-chlorobenzyl, 2,4-dichlorobenzyl, p-methoxybenzyl, methoxybenzyl, 2-cyanoethyl, 2-cyanopropyl, 2-methoxycarbonylethyl, 2-ethoxycarbonylethyl, 2-butoxycarbonylpropyl, 1,2-di(methoxycarbonyl)ethyl, methoxy, ethoxy, 1,3-dioxolan-2-yl, 1,3-dioxan-2-yl, 2-methyl-1,3-dioxolan-2-yl, 4-methyl-1,3-dioxolan-2-yl, 2-dimethylaminoethyl, 2-dimethylaminopropyl, 3-dimethylaminopropyl, 4-dimethylaminobutyl, 6-dimethylaminohexyl, 2-phenoxyethyl, 2-phenoxypropyl, 3-phenoxypropyl, 4-phenoxybutyl, 6-phenoxyhexyl, 2-methoxyethyl, 2-methoxypropyl, 3-methoxypropyl, 4-methoxybutyl, 6-methoxyhexyl, 2-ethoxyethyl, 2-ethoxypropyl, 3-ethoxypropyl, 4-ethoxybutyl, 6-ethoxyhexyl, $C_nF_{2(n-a)+(1-b)}H_{2+b}$ where n is 1 to 30, $0 \le a \le n$ and b=0 or 1 (for example $CF_3$, $C_2F_5$, $CH_2CH_2$—$C_{(n-2)}F_{2(n-2)+1}$, $C_6F_{13}$, $C_8F_{17}$, $C_{10}F_{21}$, $C_{12}F_{25}$), chloromethyl, 2-chloroethyl, trichloromethyl, 1,1-dimethyl-2-chloroethyl, methoxymethyl, 2-butoxyethyl, diethoxymethyl, diethoxyethyl, 2-isopropoxyethyl, 2-butoxypropyl, 2-octyloxyethyl, 2-methoxyisopropyl, 2-(methoxycarbonyl)methyl, 2-(ethoxycarbonyl)methyl, 2-(n-butoxycarbonyl)methyl, butylthiomethyl, 2-dodecylthioethyl, 2-phenylthioethyl, 5-methoxy-3-oxapentyl, 8-methoxy-3,6-dioxaoctyl, 11-methoxy-3,6,9-trioxaundecyl, 7-methoxy-4-oxaheptyl, 11-methoxy-4,8-dioxaundecyl, 15-methoxy-4,8,12-trioxapentadecyl, 9-methoxy-5-oxanonyl, 14-methoxy-5,10-dioxatetradecyl, 5-ethoxy-3-oxapentyl, 8-ethoxy-3,6-dioxaoctyl, 11-ethoxy-3,6,9-trioxaundecyl, 7-ethoxy-4-oxaheptyl, 11-ethoxy-4,8-dioxaundecyl, 15-ethoxy-4,8,12-trioxapentadecyl, 9-ethoxy-5-oxanonyl or 14-ethoxy-5,10-oxatetradecyl.

$C_2$-$C_{18}$-alkenyl optionally substituted by suitable functional groups, aryl, alkyl, aryloxy, alkyloxy, halogen, heteroatoms and/or heterocycles and/or interrupted by one or more oxygen and/or sulfur atoms and/or one or more substituted or unsubstituted imino groups is preferably vinyl, 2-propenyl, 3-butenyl, cis-2-butenyl, trans-2-butenyl or $C_nF_{2(n-a)-(1-b)}H_{2a-b}$ where n s 30, $0 \le a \le n$ and b=0 or 1.

$C_5$-$C_{12}$-aryl optionally substituted by suitable functional groups, aryl, alkyl, aryloxy, alkyloxy, halogen, heteroatoms and/or heterocycles is preferably phenyl, tolyl, xylyl, α-naphthyl, β-naphthyl, 4-diphenylyl, chlorophenyl, dichlorophenyl, trichlorophenyl, difluorophenyl, methylphenyl, dimethylphenyl, trimethylphenyl, ethylphenyl, diethylphenyl, isopropylphenyl, tert-butylphenyl, dodecylphenyl, methoxyphenyl, dimethoxyphenyl, ethoxyphenyl, hexyloxyphenyl, methylnaphthyl, isopropylnaphthyl, chloronaphthyl, ethoxynaphthyl, 2,6-dimethylphenyl, 2,4,6-trimethylphenyl, 2,6-dimethoxyphenyl, 2,6-dichlorophenyl, 4-bromophenyl, 2-nitrophenyl, 4-nitrophenyl, 2,4-dinitrophenyl, 2,6-dinitrophenyl, 4-dimethylaminophenyl, 4-acetylphenyl, methoxyethylphenyl, ethoxymethylphenyl, methylthiophenyl, lsopropylthlophenyl or tert-butylthlophenyl or $C_6F_{(5-a)}H_a$ where $0 \le a \le 5$.

$C_5$-$C_{12}$-cycloalkyl optionally substituted by suitable functional groups, aryl, alkyl, aryloxy, alkyloxy, halogen, heteroatoms and/or heterocycles is preferably cyclopentyl, cyclohexyl, cyclooctyl, cyclododecyl, methylcyclopentyl, dimethylcyclopentyl, methylcyclohexyl, dimethylcyclohexyl, diethylcyclohexyl, butylcyclohexyl, methoxycyclohexyl, dimethoxycyclohexyl, dlethoxycyclohexyl, butyithlocyclohexyl, chlorocyclohexyl, dichlorocyclohexyl, dichlorocyclopentyl, $C_nF_{2(n-a)-(1-a)}H_{2-b}$ where $n \le 30$, $0 \le a \le n$ and b=0 or 1 and also a saturated or unsaturated bicyclic system such as for example norbornyl or norbornenyl.

$C_5$-$C_{12}$-cycloalkenyl optionally substituted by suitable functional groups, aryl, alkyl, aryloxy, alkyloxy, halogen, heteroatoms and/or heterocycles is preferably 3-cyclopentenyl, 2-cyclohexenyl, 3-cyclohexenyl, 2,5-cyclohexadienyl or $C_nF_{2(n-a)-3(1-b)}H_{2a-3b}$ where $n \le 30$, $0 \le a \le n$ and b=0 or 1.

A five- to six-membered heterocycle which has oxygen, nitrogen and/or sulfur atoms and is optionally substituted by suitable functional groups, aryl, alkyl, aryloxy, alkyloxy, halogen, heteroatoms and/or heterocycles is preferably furyl, thiophenyl, pyrryl, pyridyl, indolyl, benzoxazolyl, dioxolyl, dioxyl, benzimidazolyl, benzothiazolyl, dimethylpyridyl, methylquinolyl, dimethylpyrrol, methoxyfuryl, dimethoxypyridyl or difluoropyridyl.

If two adjacent radicals together form an unsaturated, saturated or aromatic ring which is optionally substituted by suitable functional groups, aryl, alkyl, aryloxy, alkyloxy, halogen, heteroatoms and/or heterocycles and is optionally interrupted by one or more oxygen and/or sulfur atoms and/or one or more substituted or unsubstituted imino groups, this is preferably 1,3-propylene, 1,4-butylene, 1,5-pentylene, 2-oxa-1,3-propylene, 1-oxa-1,3-propylene, 2-oxa-1,3-propylene, 1-oxa-1,3-propenylene, 3-oxa-1,5-pentylene, 1-aza-1,3-propenylene, 1-$C_1$-$C_4$-alkyl-1-aza-1,3-propenylene, 1,4-buta-1,3-dienylene, 1-aza-1,4-buta-1,3-dienylene or 2-aza-1,4-buta-1,3-dienylene.

If the abovementioned radicals comprise oxygen and/or sulfur atoms and/or substituted or unsubstituted imino groups, the number of oxygen and/or sulfur atoms and/or imino groups is not subject to any restrictions. Generally, it amounts to not more than 5 in the radical, preferably not more than 4 and very particularly preferably not more than 3.

If the abovementioned radicals comprise heteroatoms, there will generally be at least one carbon atom, preferably at least two carbon atoms, between two heteroatoms.

Particularly preferably, the radicals $R^1$ to $R^9$ independently of one another are hydrogen;

unbranched or branched $C_1$-$C_{18}$-alkyl which has 1 to 20 carbon atoms in total and is unsubstituted or mono- to polysubstituted by halogen, phenyl, cyano, $C_1$-$C_6$-alkoxycarbonyl and/or such as for example methyl, ethyl, 1-propyl, 2-propyl, 1-butyl, 2-butyl, 2-methyl-1-propyl (isobutyl), 2-methyl-2-propyl (tert-butyl), 1-pentyl, 2-pentyl, 3-pentyl, 2-methyl-1-butyl, 3-methyl-1-butyl, 2-methyl-2-butyl, 3-methyl-2-butyl, 2,2-dimethyl-1-propyl, 1-hexyl, 2-hexyl, 3-hexyl, 2-methyl-1-pentyl, 3-methyl-1-pentyl, 4-methyl-1-pentyl, 2-methyl-2-pentyl, 3-methyl-2-pentyl, 4-methyl-2-pentyl, 2-methyl-3-pentyl, 3-methyl-3-pentyl, 2,2-dimethyl-1-butyl, 2,3-dimethyl-1-butyl, 3,3-dimethyl-1-butyl, 2-ethyl-1-butyl, 2,3-dimethyl-2-butyl, 3,3-dimethyl-2-butyl, 1-heptyl, 1-octyl, 1-nonyl, 1-decyl, 1-undecyl, 1-dodecyl, 1-tetradecyl, 1-hexadecyl, 1-octadecyl, benzyl, 3-phenylpropyl, 2-cyanoethyl, 2-(methoxycarbonyl)ethyl, 2-(ethoxycarbonyl)ethyl, 2-(n-butoxycarbonyl)ethyl, trifluoromethyl, difluoromethyl, fluoromethyl, pentafluoroethyl, heptafluoropropyl, heptafluoroisopropyl, nonafluorobutyl, nonafluoroisobutyl, undecylfluoropentyl and undecylfluoroisopentyl;

glycols, butylene glycols and oligomers thereof having 1 to 100 units and a $C_1$- to $C_8$-alkyl as end group, such as for example $R^AO$—$(CHR^B$—$CH_2$—$O)_n$—$CHR^B$—$CH_2$— or $R^AO$—$(CH_2CH_2CH_2CH_2O)_n$—$CH_2CH_2CH_2CH_2O$— where $R^A$ and $R^B$ are preferably methyl or ethyl and n is preferably 0 to 3, especially 3-oxabutyl, 3-oxapentyl, 3,6-dioxaheptyl, 3,6-dioxaoctyl, 3,6,9-trioxadecyl, 3,6,9-trioxaundecyl, 3,6,9,12-tetraoxatridecyl and 3,6,9,12-tetraoxatetradecyl;

vinyl;

1-propen-1-yl, 1-propen-2-yl and 1-propen-3-yl; and

N,N-di-$C_1$-$C_6$-alkylamino, such as for example N,N-dimethylamino and N,N-diethylamino, where if IIIw is III, then $R^3$ is not hydrogen.

The radicals $R^1$ to $R^9$ independently of one another very particularly preferably are hydrogen or $C_1$-$C_{18}$-alkyl, such as for example methyl, ethyl, 1-butyl, 1-pentyl, 1-hexyl, 1-heptyl, 1-octyl, or are phenyl, 2-cyanoethyl, 2-(methoxycarbonyl)ethyl, 2-(ethoxycarbonyl)ethyl, 2-(n-butoxycarbonyl)ethyl, N,N-dimethylamino, N,N-diethylamino, chlorine and also $CH_3O$—$(CH_2CH_2O)_n$—$CH_2CH_2$— and $CH_3CH_2O$—$(CH_2CH_2O)$~-$CH_2CH_2$— where n is 0 to 3, where if IIIw is III, then $R^3$ is not hydrogen.

Pyridinium ions (IVa) used are very particularly preferably those in which
  one of the radicals $R^1$ to $R^5$ is methyl, ethyl or chlorine and the remaining radicals $R^1$ to $R^5$ are hydrogen;
  $R^3$ is dimethylamino and the remaining radicals $R^1$, $R^2$, $R^4$ and $R^5$ are hydrogen;
  all of the radicals $R^1$ to $R^5$ are hydrogen;
  $R^1$ and $R^2$ or $R^2$ and $R^3$ is 1,4-buta-1,3-dienylene and the remaining radicals $R^1$, $R^2$, $R^4$ and $R^5$ are hydrogen;
and especially those in which
  $R^1$ to $R^5$ are hydrogen; or
  one of the radicals $R^1$ to $R^5$ is methyl or ethyl and the remaining radicals $R^1$ to $R^5$ are hydrogen.

Very particularly preferred pyridinium ions (IVa) include 1-methylpyridinium, 1-ethylpyridinium, 1-(1-butyl)pyridinium, 1-(1-hexyl)pyridinium, 1-(1-octyl)pyridinium, 1-(1-hexyl)pyridinium, 1-(1-octyl)pyridinium, 1-(1-dodecyl)pyridinium, 1-(1-tetradecyl)pyridinium, 1-(1-hexadecyl)pyridinium, 1,2-dimethylpyridinium, 1-ethyl-2-methylpyridinium, 1-(1-butyl)-2-methylpyridinium, 1-(1-hexyl)-2-methylpyridinium, 1-(1-octyl)-2-methylpyridinium, 1-(1-dodecyl)-2-methylpyridinium, 1-(1-tetradecyl)-2-methylpyridinium, 1-(1-hexadecyl)-2-methylpyridinium, 1-methyl-2-ethylpyridinium, 1,2-dimethylpyridinium, 1-(1-butyl)-2-ethylpyridinium, 1-(1-hexyl)-2-ethylpyridinium, 1-(1-octyl)-2-ethylpyridinium, 1-(1-dodecyl)-2-ethylpyridinium, 1-(1-tetradecyl)-2-ethylpyridinium, 1-(1-hexadecyl)-2-ethylpyridinium, 1,2-dimethyl-5-ethylpyridinium, 1,5-diethyl-2-methylpyridinium, 1-(1-butyl)-2-methyl-3-ethylpyridinium, 1-(1-hexyl)-2-methyl-3-ethylpyridinium and 1-(1-octyl-2-methyl-3-ethylpyridinium, 1-(1-dodecyl)-2-methyl-3-ethylpyridinium, 1-(1-tetradecyl)-2-methyl-3-ethylpyridinium and 1-(1-hexadecyl)-2-methyl-3-ethylpyridinium.

Pyridazinium ions (IVb) used are very particularly preferably those in which
  R1 to $R^4$ are hydrogen; or
  one of the radicals $R^1$ to $R^4$ is methyl or ethyl and the remaining radicals $R^1$ to $R^4$ are hydrogen.

Pyrimidinium ions (IVc) used are very particularly preferably those in which
  $R^1$ is hydrogen, methyl or ethyl and $R^2$ to $R^4$ independently of one another are hydrogen or methyl; or
  $R^1$ is hydrogen, methyl or ethyl, $R^2$ and R4 are methyl and $R^3$ is hydrogen.

Pyrazinium ions (IVd) used are very particularly preferably those in which
  $R^1$ is hydrogen, methyl or ethyl and $R^2$ to R4 independently of one another are hydrogen or methyl;
  $R^1$ is hydrogen, methyl or ethyl, $R^2$ and R4 are methyl and $R^3$ is hydrogen;
  $R^1$ to R4 are methyl; or
  $R^1$ to R4 are hydrogen.

Imidazolium ions (IVe) used are very particularly preferably those in which
  $R^1$ is hydrogen, methyl, ethyl, 1-propyl, 1-butyl, 1-pentyl, 1-hexyl, 1-octyl or 2-cyanoethyl and $R^2$ to R4 independently of one another are hydrogen, methyl or ethyl.

Very particularly preferred imidazolium ions (IVe) include 1-methylimidazolium, 1-ethylimidazolium, 1-(1-butyl)imidazolium, 1-(1-octyl)imidazolium, 1-(1-dodecyl)imidazolium, 1-(1-tetradecyl)imidazolium, 1-(1-hexadecyl)imidazolium, 1,3-dimethylimidazolium, 1-ethyl-3-methylimidazolium, 1-(1-butyl)-3-methylimidazolium, 1-(1-butyl)-3-ethylimidazolium, 1-(1-hexyl)-3-methylimidazolium, 1-(1-hexyl)-3-ethylimidazolium, 1-(1-hexyl)-3-butylimidazolium, 1-(1-octyl)-3-methylimidazolium, 1-(1-octyl)-3-ethylimidazolium, 1-(1-octyl)-3-butylimidazolium, 1-(1-dodecyl)-3-methylimidazolium, 1-(1-dodecyl)-3-ethylimidazolium, 1-(1-dodecyl)-3-butylimidazolium, 1-(1-dodecyl)-3-octylimidazolium, 1-(1-tetradecyl)-3-methylimidazolium, 1-(1-tetradecyl)-3-ethylimidazolium, 1-(1-tetradecyl)-3-butylimidazolium, 1-(1-tetradecyl)-3-octylimidazolium, 1-(1-hexadecyl)-3-methylimidazolium, 1-(1-hexadecyl)-3-ethylimidazolium, 1-(1-hexadecyl)-3-butylimidazolium, 1-(1-hexadecyl)-3-octylimidazolium, 1,2-dimethylimidazolium, 1,2,3-trimethylimidazolium, 1-ethyl-2,3-dimethylimidazolium, 1-(1-butyl)-2,3-dimethylimidazolium, 1-(1-hexyl)-2,3-dimethylimidazolium, 1-(1-octyl)-2,3-dimethylimidazolium, 1,4-dimethylimidazolium, 1,3,4-trimethylimidazolium, 1,4-dimethyl-3-ethylimidazolium, 3-butylimidazolium, 1,4-dimethyl-3-octylimidazolium, 1,4,5-trimethylimidazolium, 1,3,4,5-tetramethylimidazolium, 1,4,5-trimethyl-3-ethylimidazolium, 1,4,5-trimethyl-3-butylimidazolium, 1,4,5-trimethyl-3-octylimidazolium and 1-(prop-1-en-3-yl)-3-methylimidazolium.

The most-preferred 1,3-dialkylimidazolium ions are the 1-butyl-3-methylimidazolium ion and 1-ethyl-3-methylimidazolium ion.

Pyrazolium ions (IVf), (IVg) or (IVg') used are very particularly preferably those in which
  $R^1$ is hydrogen, methyl or ethyl and $R^2$ to $R^4$ independently of one another are hydrogen or methyl.

Pyrazolium ions (IVh) used are very particularly preferably those in which
  $R^1$ to $R^4$ independently of one another are hydrogen or methyl.

1-Pyrazolium ions (IVl) used are very particularly preferably those in which
  $R^1$ to $R^6$ independently of one another are hydrogen or methyl.

2-Pyrazolinium ions (IVj) or (IVj') used are very particularly preferably those in which
  $R^1$ is hydrogen, methyl, ethyl or phenyl and $R^2$ to $R^6$ independently of one another are hydrogen or methyl.

3-Pyrazolinium ions (IVk) or (IVk') used are very particularly preferably those in which
  $R^1$ and $R^2$ independently of one another are hydrogen, methyl, ethyl or phenyl and $R^3$ to $R^6$ independently of one another are hydrogen or methyl.

Imidazolinium ions (IVl) used are very particularly preferably those in which
  $R^1$ and $R^2$ independently of one another are hydrogen, methyl, ethyl, 1-butyl or phenyl, $R^3$ and R4 independently of one another are hydrogen, methyl or ethyl and $R^5$ and $R^6$ independently of one another are hydrogen or methyl.

Imidazolinium ions (IVm) or (IVm') used are very particularly preferably those in which
  $R^1$ and $R^2$ independently of one another are hydrogen, methyl or ethyl and $R^3$ to $R^6$ independently of one another are hydrogen or methyl.

Imidazolinium ions (IVn) or (IVn') used are very particularly preferably those in which $R^1$ to $R^3$ independently of one another are hydrogen, methyl or ethyl and $R^4$ to $R^6$ independently of one another are hydrogen or methyl.

Thiazolium ions (IVo) or (IVo') and oxazolium ions (IVp) used are very particularly preferably those in which
- $R^1$ is hydrogen, methyl, ethyl or phenyl and $R^2$ and $R^3$ independently of one another are hydrogen or methyl.

1,2,4-Triazolium ions (IVq), (Vq') or (IVq") used are very particularly preferably those in which
- $R^1$ and $R^2$ independently of one another are hydrogen, methyl, ethyl or phenyl and $R^3$ is hydrogen, methyl or phenyl.

1,2,3-Triazolium ions (IVr), (IVr') or (IVr") used are very particularly preferably those in which
- $R^1$ is hydrogen, methyl or ethyl and $R^2$ and $R^3$ independently of one another are hydrogen or methyl, or $R^2$ and $R^3$ together are 1,4-buta-1,3-dienylene.

Pyrrolidinium ions (IVs) used are very particularly preferably those in which
- $R^1$ is hydrogen, methyl, ethyl or phenyl and $R^2$ to $R^9$ independently of one another are hydrogen or methyl.

Imidazolidinium ions (IVt) used are very particularly preferably those in which
- $R^1$ and $R^4$ independently of one another are hydrogen, methyl, ethyl or phenyl and $R^2$ and $R^3$ and also $R^5$ to $R^6$ independently of one another are hydrogen or methyl.

Ammonium ions (IVu) used are very particularly preferably those in which
- $R^1$ to $R^3$ independently of one another are $C_1$- to $C_{18}$-alkyl; or
- $R^1$ and $R^2$ together are 1,5-pentylene or 3-oxa-1,5-pentylene and $R^3$ is $C_1$-$C_{18}$-alkyl or 2-cyanoethyl.

Very particularly preferred ammonium ions from the group (IVu) include methyltri(1-butyl)ammonium and tetra(1-butyl)ammonium; from the group (IVx1) N,N-dimethylpiperidinium and 1-butyl-1-methylpiperidinium; from the group (IVx2) 1-ethyl-3-methylimidazolinium; and from the group (IVx3) N,N-dimethylmorpholinium.

Examples of tertiary amines, from which the quaternary ammonium ions of the general formula (IVu) are derived by quaternization with the stated radicals R, are diethyl-n-butylamine, diethyl-tert-butylamine, diethyl-n-pentylamine, diethylhexylamine, diethyloctylamine, diethyl(2-ethylhexyl)amine, di-n-propylbutylamine, di-n-propyl-n-pentylamine, di-n-propylhexylamine, di-n-propyloctylamine, di-n-propyl(2-ethylhexyl)amine, diisopropylethylamine, diisopropyl-n-propylamine, diisopropylbutylamine, diisopropylpentylamine, diisopropylhexylamine, diisopropyloctylamine, diisopropyl(2-ethylhexyl)amine, di-n-butylethylamine, di-n-butyl-n-propylamine, di-n-butyl-n-pentylamine, di-n-butylhexylamine, di-n-butyloctylamine, di-n-butyl(2-ethylhexyl)amine, N-n-butylpyrrolidine, N-sec-butylpyrrolidine, N-tert-butylpyrrolidine, N-n-pentylpyrrolidine, N,N-dimethylcyclohexylamine, N,N-diethylcyclohexylamine, N,N-di-n-butylcyclohexylamine, N-n-propylpiperidine, N-isopropylpiperidine, N-n-butylpiperidine, N-sec-butylpiperidine, N-tert-butylpiperidine, N-n-pentylpiperidine, N-n-butylmorpholine, N-sec-butylmorpholine, N-tert-butylmorpholine, N-n-pentylmorpholine, N-benzyl-N-ethylaniline, N-benzyl-N-n-propylaniline, N-benzyl-N-isopropylaniline, N-benzyl-N-n-butylaniline, N,N-dimethyl-p-toluidine, N,N-diethyl-p-toluidine, N,N-di-n-butyl-p-toluidine, diethylbenzylamine, di-n-propylbenzylamine, di-n-butylbenzylamine, diethylphenylamine, di-n-propylphenylamine and di-n-butylphenylamine.

Preferred quaternary ammonium salts of the general formula (IVu) are those that can be derived from the following tertiary amines by quaternization with the stated radicals R, such as diisopropylethylamine, diethyl-tert-butylamine, diisopropylbutylamine, di-n-butyl-n-pentylamine, N,N-di-n-butylcyclohexylamine and also tertiary amines derived from pentyl isomers.

Particularly preferred tertiary amines are di-n-butyl-n-pentylamine and tertiary amines derived from pentyl isomers. A further preferred tertiary amine which has three identical radicals is triallylamine.

Guanidinium ions (IVv) used are very particularly preferably those in which
- the nitrogen atoms are present in ring structures; or
- $R^1$ to $R^5$ are methyl.

A very particularly preferred guanidinium ion (IVv) is N,N,N',N',N",N"-hexamethylguanidinium.

Cholinium ions (IVw) used are very particularly preferably those in which
- $R^1$ and $R^2$ independently of one another are methyl, ethyl, 1-butyl or 1-octyl and $R^3$ is methyl or ethyl, 2;
- $R^1$ is methyl, ethyl, 1-butyl or 1-octyl, $R^2$ is a —$CH_2$—$CH_2$—$OR^4$ group and $R^3$ and $R^4$ independently of one another are methyl or ethyl; or
- $R^1$ is a —$CH_2$—$CH_2$—$OR^4$ group, $R^2$ is a —$CH_2$—$CH_2$—$OR^5$ group and $R^3$ to $R^5$ independently of one another are methyl or ethyl.

Particularly preferred cholinium ions (IVw) are those in which $R^3$ is selected from methyl, ethyl, 5-methoxy-3-oxapentyl, 8-methoxy-3,6-dioxaoctyl, 11-methoxy-3,6,9-trioxaundecyl, 7-methoxy-4-oxaheptyl, 11-methoxy-4,8-dioxaundecyl, 15-methoxy-4,8,12-trioxapentadecyl, 9-methoxy-5-oxanonyl, 14-methoxy-5,10-oxatetradecyl, 5-ethoxy-3-oxapentyl, 8-ethoxy-3,6-dioxaoctyl, 11-ethoxy-3,6,9-trioxaundecyl, 7-ethoxy-4-oxaheptyl, 11-ethoxy-4,8-dioxaundecyl, 15-ethoxy-4,8,12-trioxapentadecyl, 9-ethoxy-5-oxanonyl or 14-ethoxy-5,10-oxatetradecyl.

Amidinium ions (IVx) used are very particularly preferably those in which the nitrogen atoms are present in a ring structure.

Very particularly preferred amidinium ions (IVx) include a monoprotonated form of 1,8-diazabicyclo[5.4.0]undec-7-ene (DBU) or of 1,5-diazabicyclo[4.3.0]non-5-ene.

Phosphonium ions (IVy) used are very particularly preferably those in which
- $R^1$ to $R^3$ independently of one another are $C_1$-$C_{18}$-alkyl, especially butyl, isobutyl, 1-hexyl or 1-octyl.

Among the abovementioned heterocyclic cations, preference is given to the pyridinium ions, pyrazolinium ions, pyrazolium ions and the imidazolinium and imidazolium ions. Furthermore preferred are ammonium ions.

Especially preferred are 1-methylpyridinium, 1-ethylpyridinium, 1-(1-butyl)pyridinium, 1-(1-hexyl)pyridinium, 1-(1-octyl)pyridinium, 1-(1-hexyl)pyridinium, 1-(1-octyl)pyridinium, 1-(1-dodecyl)pyridinium, 1-(1-tetradecyl)pyridinium, 1-(1-hexadecyl)pyridinium, 1,2-dimethylpyridinium, 1-ethyl-2-methylpyridinium, 1-(1-butyl)-2-methylpyridinium, 1-(1-hexyl)-2-methylpyridinium, 1-(1-octyl)-2-methylpyridinium, 1-(1-dodecyl)-2-methylpyridinium, 1-(1-tetradecyl)-2-methylpyridinium, 1-(1-hexadecyl)-2-methylpyridinium, 1-methyl-2-ethylpyridinium, 1,2-diethylpyridinium, 1-(1-butyl)-2-ethylpyridinium, 1-(1-hexyl)-2-ethylpyridinium, 1-(1-octyl)-2-ethylpyridinium, 1-(1-dodecyl)-2-ethylpyridinium, 1-(1-tetradecyl)-2-ethylpyridinium, 1-(1-hexadecyl)-2-ethylpyridinium, 1,2-dimethyl-5-ethylpyridinium, 1,5-diethyl-2-methylpyridinium, 1-(1-butyl)-2-methyl-3-ethylpyridinium, 1-(1-hexyl)-2-methyl-3-ethylpyridinium, 1-(1-octyl)-2-methyl-3-ethylpyridinium, 1-(1-dodecyl)-2- methyl-3-ethylpyridinium, 1-(1-tetradecyl)-2-methyl-3-ethylpyridinium, 1-(1-hexadecyl)-2-methyl-3-ethylpyridinium, 1-methylimidazolium, 1-ethylimidazolium, 1-(1-butyl)-imidazolium, 1-(1-octyl)imidazolium, 1-(1-dodecyl)imidazolium, 1-(1-tetradecyl)imidazolium, 1-(1-hexadecyl)imidazolium, 1,3-dimethylimidazolium, 1-ethyl-3-methylimidazolium, 1-(1-butyl)-3-methylimidazolium, 1-(1-hexyl)-3-methylimidazolium, 1-(1-octyl)-3-methylimidazolium, 1-(1-dodecyl)-3-methylimidazolium, 1-(1-tetradecyl)-3-methylimidazolium, 1-(1-hexadecyl)-3-methylimidazolium, 1,2-dimethylimidazolium, 1,2,3-trimethylimidazolium, 1-ethyl-2,3-dimethylimidazolium, 1-(1-butyl)-2,3-dimethylimidazolium, 1-(1-hexyl)-2,3-dimethylimidazolium and 1-(1-octyl)-2,3-dimethylimidazolium, 1,4-dimethylimidazolium, 1,3,4-trimethylimidazolium, 1,4-dimethyl-3-ethylimidazolium, 3-butyimidazolium, 1,4-dimethyl-3-octyimidazolium, 1,4,5-trimethylilmidazolium, 1,3,4,5-tetramethylimidazole, 1,4,5-trimethyl-3-ethylimidazolium, 1,4,5-trimethyl-3-butylimidazolium, 1,4,5-trimethyl-3-octylimidazolium and 1-(prop-1-en-3-yl)-3-methylimidazolium.

As anions, it is in principle possible to use all anions.

The anion $[Y]^{n-}$ of the ionic liquid is preferably selected from the group of the halides the group of the carboxylic acids of the general formula:

$$RCOO^{1-}$$

the group of the carbonates and carbonic esters of the general formulae:

$$HCO_3^{1-}, CO_3^{2-}, RCO_3^{1-}$$

the group of the polybasic carboxylic acids of the general formula:

$$R(COOH)_n(COO^-)_m \ (n \geq 0, m > 0)$$

the group of the aromatic hydroxyl compounds of the general formula:

$$R_mC_6H_n(OH)_p(O^-)_q \ (m+n+p+q=6, q>0).$$

Therein, R means $C_1$-$C_{30}$-alkyl, $C_2$-$C_{18}$-alkyl optionally interrupted by one or more non-adjacent oxygen and/or sulfur atoms and/or one or more substituted imino groups, $C_6$-$C_{14}$-aryl, $C_5$-$C_{12}$-cycloalkyl or a five- to six-membered heterocycle which has oxygen, nitrogen and/or sulfur atoms, where two of them together may form an unsaturated, saturated or aromatic ring optionally interrupted by one or more oxygen and/or sulfur atoms and/or one or more unsubstituted or substituted imino groups, where the stated radicals may in each case be additionally substituted by suitable functional groups, aryl, alkyl, aryloxy, alkyloxy, halogen, heteroatoms and/or heterocycles.

Therein, $C_1$-$C_{18}$-alkyl optionally substituted by suitable functional groups, aryl, alkyl, aryloxy, alkyloxy, halogen, heteroatoms and/or heterocycles is by way of example methyl, ethyl, propyl, isopropyl, n-butyl, sec-butyl, tert-butyl, pentyl, hexyl, heptyl, octyl, 2-ethylhexyl, 2,4,4-trimethylpentyl, decyl, dodecyl, tetradecyl, hexadecyl, octadecyl, 1,1-dimethylpropyl, 1,1-dimethylbutyl, 1,1,3,3-tetramethylbutyl, benzyl, 1-phenylethyl, α,α-dimethylbenzyl, benzhydryl, p-tolylmethyl, 1-(p-butylphenyl)ethyl, p-chlorobenzyl, 2,4-dichlorobenzyl, p-methoxybenzyl, methoxybenzyl, 2-cyanoethyl, 2-cyanopropyl, 2-methoxycarbonylethyl, 2-ethoxycarbonylethyl, 2-butoxycarbonylpropyl, 1,2-di(methoxycarbonyl)ethyl, 2-methoxyethyl, 2-ethoxyethyl, 2-butoxyethyl, diethoxymethyl, diethoxyethyl, 1,3-dioxolan-2-yl, 1,3-dioxan-2-yl, 2-methyl-1,3-dioxolan-2-yl, 4-methyl-1,3-dioxolan-2-yl, 2-isopropoxyethyl, 2-butoxypropyl, 2-octyloxyethyl, chloromethyl, trichloromethyl, trifluoromethyl, 1,1-dimethyl-2-chloroethyl, 2-methoxyisopropyl, 2-ethoxyethyl, butylthiomethyl, 2-dodecylthioethyl, 2-phenylthioethyl, 2,2,2-trifluoroethyl, 2-dimethylaminoethyl, 2-dimethylaminopropyl, 3-dimethylaminopropyl, 4-dimethylaminobutyl, 6-dimethylaminohexyl, 2-phenoxyethyl, 2-phenoxypropyl, 3-phenoxypropyl, 4-phenoxybutyl, 6-phenoxyhexyl, 2-methoxyethyl, 2-methoxypropyl, 3-methoxypropyl, 4-methoxybutyl, 6-methoxyhexyl, 2-ethoxyethyl, 2-ethoxypropyl, 3-ethoxypropyl, 4-ethoxybutyl or 6-ethoxyhexyl.

$C_2$-$C_{18}$-alkyl optionally interrupted by one or more non-adjacent oxygen and/or sulfur atoms and/or one or more substituted or unsubstituted imino groups is by way of example 5-methoxy-3-oxapentyl, 8-methoxy-3,6-dioxaoctyl, 11-methoxy-3,6,9-trioxaundecyl, 7-methoxy-4-oxaheptyl, 11-methoxy-4,8-dioxoundecyl, 15-methoxy-4,8,12-trioxapentadecyl, 9-methoxy-5-oxanonyl, 14-methoxy-5,10-oxatetradecyl, 5-ethoxy-3-oxapentyl, 8-ethoxy-3,6-dioxaoctyl, 11-ethoxy-3,6,9-trioxaundecyl, 7-ethoxy-4-oxaheptyl, 11-ethoxy-4,8-dioxoundecyl, 15-ethoxy-4,8,12-trioxapentadecyl, 9-ethoxy-5-oxanonyl or 14-ethoxy-5,10-oxatetradecyl.

The number of non-adjacent oxygen and/or sulfur atoms and/or imino groups is not restricted in principle or is restricted automatically by the size of the radical or the ring building block. Generally, it amounts to not more than 5 in the respective radical, preferably not more than 4 or very particularly preferably not more than 3. There is moreover generally at least one, preferably at least two, carbon atom(s) between two heteroatoms.

Substituted and unsubstituted imino groups may be, for example, imino, methylimino, isopropylimino, n-butylimino or tert-butylimino.

The term "functional groups" is to be understood by way of example to mean the following: di($C_1$-$C_4$-alkyl)amino, $C_1$-$C_4$-alkyloxycarbonyl, cyano or $C_1$-$C_4$-alkoxy. Here, $C_1$ to $C_4$-alkyl is methyl, ethyl, propyl, isopropyl, n-butyl, sec-butyl or tert-butyl.

$C_6$-$C_{14}$-aryl optionally substituted by suitable functional groups, aryl, alkyl, aryloxy, alkyloxy, halogen, heteroatoms and/or heterocycles is by way of example phenyl, tolyl, xylyl, α-naphthyl, β-naphthyl, 4-diphenylyl, chlorophenyl, dichlorophenyl, trichlorophenyl, difluorophenyl, methylphenyl, dimethylphenyl, trimethylphenyl, ethylphenyl, diethylphenyl, isopropylphenyl, tertbutylphenyl, dodecylphenyl, methoxyphenyl, dimethoxyphenyl, ethoxyphenyl, hexyloxyphenyl, methylnaphthyl, isopropylnaphthyl, chloronaphthyl, ethoxynaphthyl, 2,6-dimethylphenyl, 2,4,6-trimethylphenyl, 2,6-dimethoxyphenyl, 2,6-dichlorophenyl, 4-bromophenyl, 2- or 4-nitrophenyl, 2,4- or 2,6-dinitrophenyl, 4-dimethylaminophenyl, 4-acetylphenyl, methoxyethylphenyl or ethoxymethylphenyl.

$C_5$-$C_{12}$-cycloalkyl optionally substituted by suitable functional groups, aryl, alkyl, aryloxy, halogen, heteroatoms and/or heterocycles is for example cyclopentyl, cyclohexyl, cyclooctyl, cyclododecyl, methylcyclopentyl, dimethylcyclopentyl, methylcyclohexyl, dimethylcyclohexyl, diethylcyclohexyl, butylcyclohexyl, methoxycyclohexyl, dimethoxycyclohexyl, diethoxycyclohexyl, butylthiocyclohexyl, chlorocyclohexyl, dichlorocyclohexyl, dichlorocyclopentyl and also a saturated or unsaturated bicyclic system such as norbornyl or norbornenyl.

A five- to six-membered heterocycle which has oxygen, nitrogen and/or sulfur atoms is by way of example furyl, thiophenyl, pyryl, pyridyl, indolyl, benzoxazolyl, dioxolyl, dioxyl, benzimidazolyl, benzothiazolyl, dimethylpyridyl, methylquinolyl, dimethylpyryl, methoxyfuryl, dimethoxypyridyl, difluoropyridyl, methylthiophenyl, isopropylthiophenyl or tert-butylthiophenyl.

Particularly preferred anions in the ionic liquids are the halides, further preferably chloride, bromide and iodide, and very particularly preferably chloride.

In one further preferred embodiment, the ionic liquid is a combination of a Lewis acid and a Lewis base, where these are preferably selected from one of the abovementioned preferences.

In one preferred embodiment, the catalyst composition (iii) comprises at least one ionic liquid, wherein the ionic liquid preferably comprises a heterocyclic cation or an ammonium cation, further preferably a cation selected from the group consisting of pyridinium ions, pyrazolinium ions, pyrazolium ions, imidazolinium, imidazolium and ammonium, and a corresponding anion which is preferably selected from the group of the halides, further preferably selected from the group consisting of chloride, bromide and iodide, further preferably chloride.

The at least one ionic liquid is particularly preferably selected from the group consisting of 1-ethyl-3-methylimidazolium bromide (EMIM-Br), 1-benzyl-3-methylimidazolium chloride (BEMIM-Cl), 1-butyl-1-methylpiperidinium chloride (BMPM-Cl), 1-ethyl-2,3-dimethylimidazolium bromide (EDMIM-Br) and 1-(2-hydroxyethyl)-3-methylimidazolium chloride (HEMIM-Cl). In one further preferred embodiment, at least two of these catalysts are used.

According to one preferred embodiment, the amounts of polyisocyanate composition (i), epoxide composition (ii) and catalyst composition (iii) constitute 95% by weight, preferably 98% by weight, of the total reaction amount of all substances present.

In this embodiment, preferably no solvent is used. As a result, the melt viscosities can become very high, for which reason it is necessary to use particularly suitable mixers. Preferred examples of such mixers are extruders, microcompounders, such as those offered by Xplore, for example, or Plasti-Corders, such as those offered by Brabender, for example.

Co-catalysts

In other preferred embodiments, urea derivatives are used as co-catalyst in addition to the abovementioned catalyst composition.

The use of ureas as co-catalysts aids the reaction of the isocyanate with the epoxide. A more rapid reaction of the isocyanate is advantageous, as longer residence times of the isocyanate in the reaction mixture increase the likelihood of trimerization of the isocyanate and thus impair the chemoselectivity with respect to oxazolidone formation. Preference is given to ureas which do not split off any primary amines on decomposition, for example upon the introduction of heat.

Suitable co-catalysts are accordingly urea derivatives of the following formula

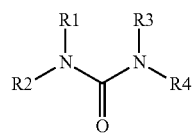

where
R1, R2, R3 and R4 are alkyl radicals having independently of one another 1 to 10 carbon atoms or
R1 and R2 are alkyl radicals having independently of one another 1 to 10 carbon atoms and R3 is an aryl radical and at the same time R4 is a hydrogen atom or R3 is an aryl radical and R4 is a hydrogen atom.

In one preferred embodiment, the aryl radical is substituted, preferably by a further urea radical. In other preferred embodiments, the aryl radical is substituted by a plurality of urea radicals. The corresponding structures are also referred to as polyurea.

In other preferred embodiments, the alkyl substituents are connected to one another and exhibit ring structures. Preferred examples of these are 1,3-dimethyl-3,4,5,6-tetrahydro-2(1H)pyrimidinone and 1,3-dimethyl-2-imidazolidinone.

Particular preference is given to co-catalysts selected from the group of 3,3'-(4-methyl-1,3-phenylene)bis(1,1-dimethylurea) and 1,1-dimethyl-3-phenylurea. Commercially available products in this category are for example the dimethylureas from AlzChem with the trade name Dyhard.

According to one preferred embodiment, the amounts of polyisocyanate composition (i), epoxide composition (ii), catalyst composition (iii) and co-catalyst constitute 95% by weight, preferably 98% by weight, of the total reaction amount of all substances present.

In one preferred embodiment, the co-catalyst is used as solvent for the reactants, where in one preferred embodiment the co-catalyst is 1,3-dimethyl-2-imidazolidone.

Co-catalysts/solvents are preferably dried prior to use thereof. In one preferred embodiment, the drying is effected by a molecular sieve.

In one embodiment, at least one solvent is used in addition to or instead of the co-catalyst. Suitable solvents are aprotic and polar, in order not to react with the isocyanate, preferably dichlorobenzene, preferably 1,2-dichlorobenzene, 1,2,3-, 1,2,4- and 1,3,5-trichlorobenzene, sulfolane, mesitylene or N-methylpyrrolidone. One particularly suitable solvent is sulfolane (tetrahydrothiophene 1,1-dioxide).

In one preferred embodiment, the water content of the reaction mixture is less than 0.1% by weight. The side reaction of the isocyanate to give urea is especially hindered in this way.

The molar ratio of the diepoxide to the diisocyanate is—as viewed over all steps (a), (b), (c) and (d)—in a range from 1.0:0.5 to 0.5:1.0, preferably from 1.0:0.9 to 0.9:1.0 and particularly preferably is 1.0:1.0. The catalyst concentration is 0.05 mol % to 5 mol % based on epoxide groups of the diepoxide, preferably 0.05 mol % to 2 mol %, and particularly preferably 0.05 mol % to 0.5 mol %. The concentration of the optional co-catalyst is 0.01 mol % to 1000 mol % based on epoxide groups of the diepoxide, preferably 0.05 mol % to 100 mol %, particularly preferably 0.05 mol % to 10 mol % and especially 0.05 mol % to 1 mol %.

According to the invention, the steps (b), (c) and (d), preferably the steps (a), (b), (c) and (d), are performed with exclusion of oxygen, further preferably in the presence of inert gas. In the context of the present invention, inert gas is to mean all materials that are gaseous under the presently selected process conditions and that are inert in stages (b), (c) and (d), preferably in stages (a), (b), (c) and (d). "Inert" in this context means that the gaseous material is converted to an extent of less than 5 mol %, preferably to an extent of less than 2 mol %, particularly preferably to an extent of less than 1 mol %. In this case, the term "inert gas" as used in this context of the present invention refers both to a single gas and to a mixture of two or more gases. For example, useful inert gases include helium, neon, argon, krypton, radon, xenon, nitrogen and gas mixtures of two or more thereof.

The present invention furthermore relates to a thermoplastic polymer obtained or obtainable by the process described above.

Thermoplastic Polymer

The invention furthermore relates to a thermoplastic polymer obtained or obtainable by reacting at least components (i) to (ii)
- i) a polyisocyanate composition comprising at least one diisocyanate;
- ii) an epoxide composition comprising at least one diepoxide;

in the presence of a catalyst composition (iii); where
- a) epoxide composition (ii) and catalyst composition (iii) are initially charged as a mixture at a temperature in a first temperature range ($T_1$);
- b) the polyisocyanate composition (i) is at least partially added while maintaining a first temperature;
- c) the temperature is raised to a temperature in a final temperature range ($T_f$);
- d) the remaining polyisocyanate composition (i) is added in the final temperature range; to give a thermoplastic polymer.

Temperature Ranges

According to (c), the temperature is raised to a temperature in a final temperature range ($T_f$). The final temperature range $T_f$ preferably comprises a second temperature range range $T_2$ and a third temperature range $T_3$, wherein the third temperature range $T_3$ is above the second temperature range $T_2$ and the second temperature range $T_2$ is above the first temperature range $T_1$. Preferentially, the final temperature range $T_f$ is >180 to 250° C., preferably >170 to 250° C., further preferably >165 to 250° C., wherein preferentially the second temperature range $T_2$ is >180 to 200° C., preferably >170 to 200° C., further preferably >165 to 200° C., and the third temperature range $T_3$ is >200 to 250° C., preferably >200 to 230° C.

According to (a), epoxide composition (ii) and catalyst composition (iii) are initially charged as a mixture at a temperature in a first temperature range ($T_1$). Preferentially, the first temperature range $T_1$ is 140 to 180° C., preferably 150 to 170° C., further preferably 155 to 165° C.

According to (b), the polyisocyanate composition (i) is at least partially added while maintaining a temperature in the first temperature range $T_1$. In the first temperature range $T_1$ according to (b) preferably 80% to 95% by weight of the polyisocyanate composition (i), based on the total amount of the polyisocyanate composition (i), is added.

"While maintaining a temperature in the first range T1" means that the temperature can deviate by up to +/−10° C., preferably by +/−5° C., further preferably by +/−3° C., from the temperature set in (a), with the temperature range $T_1$ nonetheless being complied with, i.e. the temperature remains in step (b) preferentially in the temperature range $T_1$ of 140 to 180° C., preferably in the range of 150 to 170° C., further preferably in the range of 155 to 165° C.

According to (d), the remaining polyisocyanate composition (i) is added in the final temperature range. In the final temperature range $T_f$ preferably 5% to 20% by weight of the polyisocyanate composition (i), based on the total amount of the polyisocyanate composition (i), is added, wherein preferably in the second temperature range $T_2$ 5% to 20% by weight of the polyisocyanate composition (i), and in the third temperature range $T_3$ optionally 0% to 10% by weight, preferably 0% by weight, of the polyisocyanate composition (i), in each case based on the total amount of the polyisocyanate composition (i), are added.

The addition of the polyisocyanate composition (i) in (b) and (d) is not subject to any restrictions—it can be performed continuously with an identical amount per period of time, continuously with a varying amount per period of time or discontinuously. The addition of the polyisocyanate composition (i) in (b) and (d) is preferably performed continuously with an identical amount per period of time.

Polyisocyanate Composition

According to (i), the polyisocyanate composition comprises at least one diisocyanate.

"At least one diisocyanate" is understood in the present case to mean both a single substance and a mixture of substances, preferably selected from the following list. The diisocyanates are selected from the group of the aliphatic, cycloaliphatic, araliphatic and/or aromatic isocyanates, which are further preferably selected from the group of tri-, tetra-, penta-, hexa-, hepta- and/or octamethylene diisocyanate, 2-methylpentamethylene 1,5-diisocyanate, 2-ethylbutylene 1,4-diisocyanate, pentamethylene 1,5-diisocyanate, butylene 1,4-diisocyanate, 1-isocyanato-3,3,5-trimethyl-5-isocyanatomethylcyclohexane (isophorone diisocyanate, IPDI), 1,4- and/or 1,3-bis(isocyanatomethyl) cyclohexane (HXDI), cyclohexane 1,4-diisocyanate, 1-methylcyclohexane 2,4- and/or 2,6-diisocyanate, dicyclohexylmethane 4,4'-, 2,4'- and/or 2,2'-diisocyanate, diphenylmethane 2,2'-, 2,4'- and/or 4,4'-diisocyanate (MDI), naphthylene 1,5-diisocyanate (NDI), tolylene 2,4- and/or 2,6-diisocyanate (TDI), diphenylmethane diisocyanate, dimethyl diphenyl 3,3'-diisocyanate, diphenylethane 1,2-diisocyanate, dicyclohexylmethane 4,4'-, 2,4'- and 2,2'-diisocyanate (H12 MDI), praraphenylene 2,4-diisocyanate (PPDI), tetramethylenexylene 2,4-diisocyanate (TMXDI). Aromatic diisocyanates selected from the above list are preferred. The isocyanate is further preferably selected from the group of tolylene diisocyanate (TDI), diphenylmethane diisocyanate (MDI) and naphthylene 1,5-diisocyanate (NDI). Tolylene diisocyanate (TDI) or diphenylmethane diisocyanate (MDI) is very particularly preferred.

According to one embodiment, the polyisocyanate composition (i) does not comprise any isocyanate having a functionality of greater than 2.0. This means that the polyisocyanate composition (i) only comprises diisocyanates having a functionality of 2.0, where this preferably comprises diisocyanates having a functionality in the range of 1.95 to 2.05. The polyisocyanate composition (i) further preferably is composed of at least 98% by weight of the at least one diisocyanate, respectively based on the total weight of the polyisocyanate composition (i).

The functionality of an isocyanate, i.e. the content of isocyanate groups, is determined in accordance with DIN EN ISO 14896.

Epoxide Composition

According to (ii), the epoxide composition comprises at least one diepoxide.

"At least one diepoxide" is understood in the present case to mean both a single substance and a mixture of substances. The epoxide composition (ii) preferably does not comprise any epoxide having a functionality of greater than 2.0. This means that the epoxide composition (ii) only comprises diepoxides having a functionality of 2.0, where this preferably comprises diepoxides having a functionality in the range of 1.95 to 2.05. In one preferred embodiment, the epoxide composition (ii) is composed of at least 98% by weight of the at least one diepoxide, respectively based on the total weight of the epoxide composition (ii).

These diepoxides may in this case be either saturated or unsaturated, aliphatic, cycloaliphatic, aromatic or heterocyclic. They may furthermore comprise those substituents that do not cause any interfering side reactions under the reaction conditions, for example alkyl or aryl substituents, ether groups and the like.

The diepoxides are preferably polyglycidyl ethers based on dihydric alcohols, phenols, hydrogenation products of these phenols and/or on novolaks. Novolaks are products of reaction of phenols with aldehydes, especially formaldehyde, in the presence of acidic catalysts, particularly preferred in this case are the diglycidyl ethers. However, diepoxides based on other structures that do not comprise any ether groups are also possible.

Other preferred diepoxides are based on diglycidyl ethers of natural raw materials, preferably cardanol. One typical example of such a product is Cardolite NC 514 (Cardolite). The advantage with this epoxide is the relatively long alkyl chain between the aromatic systems which leads to a greater flexibility of the polymers produced therefrom. The advantages of aliphatic structural elements are especially effective in combination with aromatic diglycidyl ethers. Therefore, diepoxides based on aliphatic diglycidyl ethers in combination with aromatic diglycidyl ethers are particularly preferred.

The epoxide equivalent weights of these epoxide compounds are preferably between 100 and 5000, especially between 150 and 500. The epoxide equivalent weight of a substance is defined here as that amount of the substance (in grams) that comprises 1 mol of oxirane rings. In order to characterize the content of oxirane groups ("epoxide groups") in compounds, an epoxide titration is customarily conducted with a 0.1 N solution of perchloric acid in glacial acetic acid (cf. DIN EN ISO 3001). The epoxide number obtained here (% EpO) indicates how many grams of oxirane oxygen are present in 100 grams of a sample. Crystal violet is used as indicator. Determination requires the absence of water, bases and amines. The epoxide content % EpO is calculated, from the consumption in ml of 0.1 N perchloric acid during the titration (x), the consumption in ml of 0.1 N perchloric acid in the blank sample (y) and the initial mass of the sample to be investigated in grams (E), as follows: % EpO=[(x-y)*0.160]/E. The epoxide equivalent weight (EEW) is in turn calculated from this according to the following formula: EEW=1600/% EpO, where the units of EEW are g/eq.

The following compounds may preferably be considered as polyhydric phenols: resorcinol, hydroquinone, 2,2-bis(4-hydroxyphenyl)propane (bisphenol A), isomeric mixtures of dihydroxydiphenylmethane (bisphenol F), tetrabromobisphenol A, 4,4'-dihydroxydiphenylcyclohexane, 4,4'-dihydroxy-3,3-dimethyidiphenylpropane, 4,4'-dihydroxydiphenyl, 4,4'-dihydroxybenzophenol, bis(4-hydroxyphenyl)-1,1-ethane, bis(4-hydroxyphenyl)-1,1-isobutane, bis(4-hydroxyphenyl)methane, bis(4-hydroxyphenyl) ether, bis(4-hydroxyphenyl)sulfone, and also the chlorination and bromination products of the abovementioned compounds; bisphenol A is very particularly preferred here. Examples of commercial products for bisphenol A diglycidyl ethers are DER 332, DER 331, or DER 330 from DOW U.S.A. or Epilox $A^{18}$-00 from Leuna Harze, Germany.

Catalyst

In one embodiment of the thermoplastic polymer, polyisocyanate composition according to (i) and epoxide composition according to (ii) are reacted in the presence of a catalyst composition (iii).

The catalysts used for preparing the thermoplastic polymer are ionic liquids, as have been described at the beginning with respect to the process for preparing a thermoplastic polymer by reacting at least components (i) to (ii) in the "Catalyst" section.

In one preferred embodiment of the thermoplastic polymer, the catalyst composition (iii) here too comprises at least one ionic liquid, wherein the ionic liquid further preferably comprises a heterocyclic cation or an ammonium cation, further preferably a cation selected from the group consisting of pyridinium ions, pyrazolinium ions, pyrazolium ions, imidazolinium, imidazolium and ammonium, and a corresponding anion which is preferably selected from the group of the halides, further preferably selected from the group consisting of chloride, bromide and iodide, further preferably chloride.

In one particularly preferred embodiment of the thermoplastic polymer, the at least one ionic liquid here too is selected from the group consisting of 1-ethyl-3-methylimidazolium bromide (EMIM-Br), 1-benzyl-3-methylimidazolium chloride (BEMIM-Cl), 1-butyl-1-methylpiperidinium chloride (BMPM-Cl), 1-ethyl-2,3-dimethylimidazolium bromide (EDMIM-Br) and 1-(2-hydroxyethyl)-3-methyl-imidazolium chloride (HEMIM-Cl).

For the thermoplastic polymer, the same applies in respect of co-catalysts/solvents/water content as described at the beginning with respect to the process for preparing a thermoplastic polymer in the "Co-catalyst" section.

In one embodiment of the thermoplastic polymer, the amounts of polyisocyanate composition (i), epoxide composition (ii) and catalyst composition (iii) constitute 95% by weight, preferably 98% by weight, of the total reaction amount of all substances present.

The thermoplastic polymer preferably has a number-average molar mass $M_n$ of greater than 10 000 g/mol, preferably greater than 15 000 g/mol, further preferably greater than 18 000 g/mol.

The polydispersity of the thermoplastic polymer is preferably less than 4, further preferably less than 3.5, wherein the polydispersity PI is the quotient of the weight-average molar mass $M_w$ and the number-average molar mass $M_n$ of the thermoplastic polymer.

The invention furthermore relates to the use of a thermoplastic polymer obtained or obtainable by the above-described process or of the above-described thermoplastic polymer for producing a fiber or a shaped body by injection molding, calendering, powder sintering, laser sintering, melt pressing or extrusion; or as modifier for thermoplastic material.

The present invention is illustrated in more detail by the following embodiments and combinations of embodiments which are apparent from the corresponding dependency references and other references. In particular, it should be noted that in every case where a range of embodiments is mentioned, for example in the context of an expression such as "the process according to any of embodiments 1 to 4", each embodiment in this range is deemed to be explicitly disclosed to those skilled in the art, i.e. the wording of this expression is to be understood by those skilled in the art as synonymous with "the process according to any of embodiments 1, 2, 3 and 4".

1. A process for preparing a thermoplastic polymer by reacting at least components (i) to (ii)
    i) a polyisocyanate composition comprising at least one diisocyanate;
    ii) an epoxide composition comprising at least one diepoxide;

in the presence of a catalyst composition (iii); where
a) epoxide composition (ii) and catalyst composition (iii) are initially charged as a mixture at a temperature in a first temperature range ($T_1$);
b) the polyisocyanate composition (i) is at least partially added while maintaining a temperature in the first temperature range $T_1$;
c) the temperature is raised to a temperature in a final temperature range ($T_f$);
d) the remaining polyisocyanate composition (i) is added in the final temperature range.

2. The process according to embodiment 1, wherein the final temperature range $T_f$ comprises a second temperature range range $T_2$ and a third temperature range $T_3$, wherein the third temperature range $T_3$ is above the second temperature range $T_2$ and the second temperature range $T_2$ is above the first temperature range $T_1$.

3. The process according to embodiment 1 or 2, wherein the first temperature range $T_1$ is 140 to 180° C., preferably 150 to 170° C., further preferably 155 to 165° C.

4. The process according to any of embodiments 1 to 3, wherein the final temperature range $T_f$ is >180 to 250° C., preferably >170 to 250° C., further preferably >165 to 250° C., wherein preferentially the second temperature range $T_2$ is >180 to 200° C., preferably >170 to 200° C., further preferably >165 to 200° C., and the third temperature range $T_3$ is >200 to 250° C., preferably >200 to 230° C.

5. The process according to any of embodiments 1 to 4, wherein in the first temperature range $T_1$ according to (b) 80% to 95% by weight of the polyisocyanate composition (i), based on the total amount of the polyisocyanate composition (i), is added.

6. The process according to any of embodiments 1 to 5, wherein in the final temperature range $T_f$ 5% to 20% by weight of the polyisocyanate composition (i), based on the total amount of the polyisocyanate composition (i), is added, wherein preferably in the second temperature range $T_2$ 5% to 20% by weight of the polyisocyanate composition (i), and in the third temperature range $T_3$ optionally 0% to 10% by weight, preferably 0% by weight, of the polyisocyanate composition (i), in each case based on the total amount of the polyisocyanate composition (i), are added.

7. The process according to any of embodiments 1 to 6, wherein the addition of the polyisocyanate composition (i) in (b) and (d) is performed continuously with an identical amount per period of time.

8. The process according to any of embodiments 1 to 7, wherein the polyisocyanate composition (i) does not comprise any isocyanate having a functionality of greater than 2.0, where the polyisocyanate composition (i) further preferably is composed of at least 98% by weight of the at least one diisocyanate, respectively based on the total weight of the polyisocyanate composition (i).

9. The process according to any of embodiments 1 to 8, wherein the epoxide composition (ii) does not comprise any epoxide having a functionality of greater than 2.0.

10. The process according to any of embodiments 1 to 9, wherein the epoxide composition (ii) is composed of at least 98% by weight of the at least one diepoxide, respectively based on the total weight of the epoxide composition (ii).

11. The process according to any of embodiments 1 to 10, wherein the catalyst composition (iii) comprises at least one ionic liquid, wherein the ionic liquid preferably comprises a heterocyclic cation or an ammonium cation, further preferably a cation selected from the group consisting of pyridinium ions, pyrazolinium ions, pyrazolium ions, imidazolinium, imidazolium and ammonium, and a corresponding anion which is preferably selected from the group of the halides, further preferably selected from the group consisting of chloride, bromide and iodide, further preferably chloride.

12. The process according to embodiment 11, wherein the at least one ionic liquid is selected from the group consisting of 1-ethyl-3-methylimidazolium bromide (EMIM-Br), 1-benzyl-3-methylimidazolium chloride (BEMIM-Cl), 1-butyl-1-methylpiperidinium chloride (BMPM-Cl), 1-ethyl-2,3-dimethyiimidazolium bromide (EDMIM-Br) and 1-(2-hydroxyethyl)-3-methylimidazolium chloride (HEMIM-Cl).

13. The process according to any of embodiments 1 to 12, wherein the amounts of polyisocyanate composition (i), epoxide composition (ii) and catalyst composition (iii) constitute 95% by weight, preferably 98% by weight, of the total reaction amount of all substances present.

14. A thermoplastic polymer obtained or obtainable by a process according to any of embodiments 1 to 13.

15. A thermoplastic polymer obtained or obtainable by reacting at least components (i) to (ii)
i) a polyisocyanate composition comprising at least one diisocyanate;
ii) an epoxide composition comprising at least one diepoxide;
in the presence of a catalyst composition (iii); where
a) epoxide composition (ii) and catalyst composition (iii) are initially charged as a mixture at a temperature in a first temperature range ($T_1$);
b) the polyisocyanate composition (i) is at least partially added while maintaining a first temperature;
c) the temperature is raised to a temperature in a final temperature range ($T_f$);
d) the remaining polyisocyanate composition (i) is added in the final temperature range;
to give a thermoplastic polymer.

16. The thermoplastic polymer according to embodiment 15, wherein the final temperature range $T_f$ comprises a second temperature range range $T_2$ and a third temperature range $T_3$, wherein the third temperature range $T_3$ is above the second temperature range $T_2$ and the second temperature range $T_2$ is above the first temperature range $T_1$.

17. The thermoplastic polymer according to embodiment 15 or 16, wherein the first temperature range $T_1$ is 140 to 180° C., preferably 150 to 170° C., further preferably 155 to 165° C.

18. The thermoplastic polymer according to any of embodiments 15 to 17, wherein the final temperature range $T_f$ is >180 to 250° C., preferably >170 to 250° C., further preferably >165 to 250° C., wherein preferentially the second temperature range $T_2$ is >180 to 200° C., preferably >170 to 200° C., further preferably >165 to 200° C., and the third temperature range $T_3$ is >200 to 250° C., preferably >200 to 230° C.

19. The thermoplastic polymer according to any of embodiments 15 to 18, wherein in the first temperature range $T_1$ according to (b) 80% to 95% by weight of the polyisocyanate composition (i), based on the total amount of the polyisocyanate composition (i), is added.

20. The thermoplastic polymer according to any of embodiments 15 to 19, wherein in the final temperature range $T_f$ 5% to 20% by weight of the polyisocyanate composition (i), based on the total amount of the polyisocyanate composition (i), is added, wherein preferably in the second temperature range $T_2$ 5% to 20% by weight of the polyisocyanate composition (i), and in the third temperature range $T_3$ optionally 0% to 10% by weight, preferably 0% by weight, of the polyisocyanate composition (i), in each case based on the total amount of the polyisocyanate composition (i), are added.

21. The thermoplastic polymer according to any of embodiments 15 to 20, wherein the addition of the polyisocyanate composition (i) in (b) and (d) is performed continuously with an identical amount per period of time.

22. The thermoplastic polymer according to any of embodiments 15 to 21, wherein the polyisocyanate composition (i) does not comprise any isocyanate having a functionality of greater than 2.0, where the polyisocyanate composition (i) further preferably is composed of at least 98% by weight of the at least one diisocyanate, respectively based on the total weight of the polyisocyanate composition (i).

23. The thermoplastic polymer according to any of embodiments 15 to 22, wherein the epoxide composition (ii) does not comprise any epoxide having a functionality of greater than 2.0.

24. The thermoplastic polymer according to any of embodiments 15 to 23, wherein the epoxide composition (ii) is composed of at least 98% by weight of the at least one diepoxide, respectively based on the total weight of the epoxide composition (ii).

25. The thermoplastic polymer according to any of embodiments 15 to 24, wherein the catalyst composition (iii) comprises at least one ionic liquid, wherein the ionic liquid preferably comprises a heterocyclic cation or an ammonium cation, further preferably a cation selected from the group consisting of pyridinium ions, pyrazolinium ions, pyrazolium ions, imidazolinium, imidazolium and ammonium, and a corresponding anion which is preferably selected from the group of the halides, further preferably selected from the group consisting of chloride, bromide and iodide, further preferably chloride.

26. The thermoplastic polymer according to embodiment 25, wherein the at least one ionic liquid is selected from the group consisting of 1-ethyl-3-methylimidazolium bromide (EMIM-Br), 1-benzyl-3-methylimidazolium chloride (BEMIM-Cl), 1-butyl-1-methylpiperidinium chloride (BMPM-Cl), 1-ethyl-2,3-dimethylimidazolium bromide (EDMIM-Br) and 1-(2-hydroxyethyl)-3-methylimidazolium chloride (HEMIM-Cl).

27. The thermoplastic polymer according to any of embodiments 15 to 26, wherein the amounts of polyisocyanate composition (i), epoxide composition (ii) and catalyst composition (iii) constitute 95% by weight, preferably 98% by weight, of the total reaction amount of all substances present.

28. The thermoplastic polymer according to any of embodiments 15 to 27, wherein the thermoplastic polymer has a number-average molar mass $M_n$ of greater than 10 000 g/mol, preferably greater than 15 000 g/mol, further preferably greater than 18 000 g/mol.

29. The thermoplastic polymer according to any of embodiments 15 to 28, wherein the polydispersity is less than 4, preferably less than 3.5, wherein the polydispersity PI is the quotient of the weight-average molar mass $M_w$ and the number-average molar mass $M_n$ of the thermoplastic polymer.

30. The use of a thermoplastic polymer obtained or obtainable by the process according to any of embodiments 1 to 14 or of the thermoplastic polymer according to any of embodiments 15 to 29 for producing a fiber or a shaped body by injection molding, calendering, powder sintering, laser sintering, melt pressing or extrusion; or as modifier for thermoplastic material.

The examples below serve to illustrate the invention, but are in no way restrictive in respect of the subject matter of the present invention.

EXAMPLES

1. Chemicals

| Name | Chemical designation |
|---|---|
| Diepoxide 1 | Bisphenol A diglycidyl ether (D.E.R. 332, bisphenol A diglycidyl ether from Sigma Aldrich, CAS 1675-54-3) |
| Diisocyanate 1 | Diphenylmethane 4,4'-diisocyanate (4,4'-MDI) |
| Diisocyanate 2 | Tolylene 2,4-diisocyanate (2,4-TDI) |
| Catalyst 1 | 1-Butyl-1-methylpiperidinium chloride (BMPM-Cl) |
| Catalyst 2 | 1-Ethyl-2,3-dimethylimidazolium bromide |
| Solvent 1 | Lactic acid dimethylamide |

2. Examples 2.1 Example 1: Reaction of Bisphenol a Diglycidyl Ether with MDI with Temperature Gradient During the Addition of the MDI In a nitrogen box, 60 g of diepoxide 1 and 0.084 g of catalyst 1 were weighed into a 100-ml glass vessel, provided with a magnetic stirrer bar and sealed. The mixture was removed from the nitrogen box and mixed on a magnetic stirrer at 80° C. for 3 h.

Both extruder screws were inserted into a 15-ml twin-screw MC 15 High Torque and High Force micro-compounder from Xplore and it was firmly closed with a torque wrench (50 Nm). Heating was then performed to 100° C. external temperature. 2 closure plates were screwed onto the extruder. The rear plate had a connection for argon inertization. The front plate had an inlet for metering isocyanate.

A 50-ml bottle containing diisocyanate 1 was melted in a drying oven at 70° C. for 1 hour. 12.2 g of the warm mixture of diepoxide 1 and catalyst 1 were introduced into the extruder, heated to 100° C., by briefly removing the front closure plate. The insulation plate was remounted after introduction and the stirrer was started at 100 rpm. For inertization, the test sample was blanketed with argon 4.6 from a gas cylinder at 20 l/h. The temperature was increased from 100° C. to 160° C. external temperature. It took 5 minutes for the internal temperature to align and be 155° C. After these 5 min, metering of 6.91 ml of diisocyanate 1 was started with an LA-100 syringe pump (from Landgraf Laborsysteme HLL GmbH) through a 10-ml syringe with cannula via the inlet in the front closure plate. To this end, a heating jacket was placed around the syringe and heated to 70° C. so that the diisocyanate 1 remained liquid. The amount was metered in continuously over exactly 1 h, with time measurement beginning at the start of metering. After 37 minutes, the viscosity in the extruder began to slowly rise. This could be recognized by the force (initially 95 N) that the extruder measured. After 55 minutes, the external temperature was increased to 190° C. At this point the extruder displayed a force of 2900 N. The force initially fell as a result of the increase in temperature, but then rose once more. 5 minutes later, the temperature was increased to 220° C. external temperature; the force at this point was 4500 N. After 60 minutes, metering of diisocyanate 1 was ended. The viscosity in the extruder rose further after the end of metering, and so 2 minutes later the temperature was increased to 235° C. The force was now 10 500 N. Within the 20 minutes of post-reaction time, the viscosity and therefore the force rose still further, to 14 000 N. After 80 minutes, the resulting polymer melt of the thermoplastic polymer (polyoxazolidone) was removed as a polymer extrudate via the discharge valve.

2.2 Comparative Example 1: Reaction of Bisphenol a Diglycidyl Ether with MDI without Temperature Gradient During the Addition of the MDI In a nitrogen box, 60 g of diepoxide 1 and 0.084 g of catalyst 1 were weighed into a 100-ml glass vessel, provided with a magnetic stirrer bar and sealed. The mixture was removed from the nitrogen box and mixed on a magnetic stirrer at 80° C. for 3 h.

Both extruder screws were inserted into a 15-ml twin-screw MC 15 High Torque and High Force micro-compounder from Xplore and it was firmly closed with a torque wrench (50 Nm). Heating was then performed to 100° C. external temperature. 2 closure plates were screwed onto the extruder. The rear plate had a connection for argon inertization. The front plate had an inlet for metering isocyanate.

A 50-ml bottle containing diisocyanate 1 was melted in a drying oven at 70° C. for 1 hour.

12.2 g of the warm mixture of diepoxide 1 and catalyst 1 were introduced into the extruder, heated to 100° C., by briefly removing the front closure plate. The insulation plate was remounted after introduction and the stirrer was started at 100 rpm. For inertization, the test sample was blanketed with argon 4.6 from a gas cylinder at 20 l/h. The temperature was increased from 100° C. to 180° C. external temperature. It took 5 minutes for the internal temperature to align to 175° C. After these 5 min, metering of 6.91 ml of diisocyanate 1 was started with an LA-100 syringe pump (from Landgraf Laborsysteme HLL GmbH) through a 10-ml syringe with cannula via the inlet in the front closure plate. To this end, a heating jacket was placed around the syringe and heated to 70° C. so that the diisocyanate 1 remained liquid. The amount was metered in continuously over exactly 1 h, with time measurement beginning at the start of metering.

After 42 minutes, the viscosity in the extruder began to rise very slowly. This could be recognized by the force (initially 88 N) that the extruder measured. After 60 minutes, metering of diisocyanate 1 was ended. The viscosity at this point was only 425 N. The viscosity in the extruder rose further after the end of metering, and so 15 minutes later the temperature was increased to 200° C. The force was now 4100 N. After a further 5 minutes the force was 7200 N. The resulting polymer melt of the thermoplastic polymer (polyoxazolidone) was removed after 80 minutes of run time as a polymer extrudate via the discharge valve.

2.3 Example 2: Reaction of Bisphenol a Diglycidyl Ether with TDI with Temperature Gradient During the Addition of the TDI In a nitrogen box, 60 g of diepoxide 1 and 0.084 g of catalyst 1 were weighed into a 100-ml glass vessel, provided with a magnetic stirrer bar and sealed. The mixture was removed from the nitrogen box and mixed on a magnetic stirrer at 80° C. for 3 h.

Both extruder screws were inserted into a 15-ml twin-screw MC 15 High Torque and High Force micro-compounder from Xplore and it was firmly closed with a torque wrench (50 Nm). Heating was then performed to 100° C. external temperature. 2 closure plates were screwed onto the extruder. The rear plate had a connection for argon inertization. The front plate had an inlet for metering isocyanate.

Exactly 13.9 g of the warm mixture of diepoxide 1 and catalyst 1 were introduced into the extruder, heated to 100° C., by briefly removing the front closure plate. The insulation plate was remounted and the stirrer was started at 100 rpm. For inertization, the test sample was blanketed with argon 4.6 from a gas cylinder at 20 l/h. The temperature was increased from 100° C. to 160° C. external temperature. It took 5 minutes for the internal temperature to align to 155° C. After these 5 min, metering of 5.77 ml of diisocyanate 2 was started with an LA-100 syringe pump (from Landgraf Laborsysteme HLL GmbH) through a 10-ml syringe with cannula via the inlet in the front closure plate. The amount was metered in continuously over exactly 1 h, with time measurement beginning at the start of metering. After 35 minutes, the viscosity in the extruder began to slowly rise. This could be recognized by the force (initially 88 N) that the extruder measured. After 50 minutes, the external temperature was increased to 190° C. At this point the extruder displayed a force of 3300 N. The force initially fell as a result of the increase in temperature, but then rose once more. 5 minutes later, the temperature was increased to 210° C. external temperature, as the extruder indicated a force of 5900 N. A further 3 minutes later, the external temperature was increased to 230° C. The extruder now indicated a force of 7800 N. After 60 minutes, the metering of diisocyanate 2 was ended. The viscosity in the extruder was now very high, which could be recognized by the force of 10 700 N. Within the 20 minutes of post-reaction time, the viscosity and therefore the force rose slightly further still, to 13 000 N.

After 80 minutes, the resulting polymer melt of the thermoplastic polymer (polyoxazolidone) was removed as a polymer extrudate via the discharge valve.

2.4 Comparative Example 2: (Isothermal) Reaction of Bisphenol a Diglycidyl Ether with TDI without Temperature Gradient During the Addition of the TDI In a nitrogen box, 60 g of diepoxide 1 and 0.084 g of catalyst 1 were weighed into a 100-ml glass vessel, provided with a magnetic stirrer bar and sealed. The mixture was removed from the nitrogen box and mixed on a magnetic stirrer at 80° C. for 3 h.

Both extruder screws were inserted into a 15-ml twin-screw MC 15 High Torque and High Force micro-compounder from Xplore and it was firmly closed with a torque wrench (50 Nm). Heating was then performed to 100° C. external temperature. 2 closure plates plus insulation plates were screwed onto the extruder. The rear plate had a connection for argon inertization. The front plate had an inlet for metering isocyanate.

Exactly 14.0 g of the warm mixture of diepoxide 1 and catalyst 1 were introduced into the extruder, heated to 100° C., by briefly removing the front closure plate. The closure and insulation plate was remounted and the stirrer was started at 100 rpm. For inertization, the test sample was blanketed with argon 4.6 from a gas cylinder at 20 l/h. The temperature was increased from 100° C. to 160° C. external temperature. It took 5 minutes for the internal temperature to align to 155° C. After these 5 min, metering of 5.77 ml of diisocyanate 2 was started with an LA-100 syringe pump (from Landgraf Laborsysteme HLL GmbH) through a 10-ml syringe with cannula via the inlet in the front closure plate. The amount was metered in continuously over exactly 1 h, with time measurement beginning at the start of metering. After 35 minutes, the viscosity in the extruder began to slowly rise. This could be recognized by the force (initially 60 N) that the extruder measured. After 60 minutes, metering of diisocyanate 2 was ended. The viscosity in the extruder was now very high, which could be recognized by the force of 14 742 N. The product was discharged via the discharge valve and removed as a polymer extrudate which had a rough surface and was not completely clear.

2.5 Analysis

Various analyses, which are described below, were conducted on the resulting polymers of examples 1 and 2 and comparative examples 1, 2, and 3.

Solubility

A solubility test in solvent 1 was performed: 0.25 g of the polymer was dissolved in 4.75 g of solvent 1. The mixture was stirred on a magnetic stirrer at 80° C. for two hours.

Molar Mass Distribution/GPC

GPC (Gel Permeation Chromatography) was used to determine the molar mass distribution of each polymer. 0.2 g of polymer was dissolved in 8 ml of N,N-dimethylacetamide (99.8%) overnight at room temperature. The next day, 100 µl were injected into the GPC via a 45-µm filter from Sartorius. Using N,N-dimethylacetamide as eluent, detection was performed on an R12000 differential refractive index detector from Duratec using the HPLC pump 0202 from Duratec at 0.7 ml/min on four 60-cm Phenogel™ 5 µm columns ($10^3$-$10^4$-$10^4$-$10^3$ Å) from Phenomenex. The measurement lasted 130 minutes. Polymethyl methacrylate served as comparative substance.

The weight-average molar mass $M_w$ and the number-average molar mass $M_n$ for each polymer were in each case determined from the values obtained. Furthermore, the polydispersity PI was determined by forming the quotient of the weight-average molar mass $M_w$ and the number-average molar mass $M_n$ of the respective thermoplastic polymer PI=$M/M_n$.

The results are given in table 1, where the amounts of the reactants diepoxide 1 and the respective diisocyanate 1 or 2, based on 100 g of diepoxide, are indicated.

TABLE 1

Formulation and properties of the polymers obtained

| Example | Diepoxide 1 [g] | Diisocyanate | NCO [g] | $T_1$ [° C.] | $t (T_1)$ [min.] |
|---|---|---|---|---|---|
| 1 | 100 | 1 | 69.8 | 160 | 55 |
| Comparative example 1 | 100 | 1 | 69.8 | 180 | 70 |
| 2 | 100 | 2 | 49.4 | 160 | 50 |
| Comparative example 2 | 100 | 2 | 49.4 | 160 | 60 |

TABLE 1-continued

| Example | $T_2$ [° C.] | $t (T_2)$ [min.] | $T_3$ [° C.] | $t (T_3)$ [min.] |
|---|---|---|---|---|
| 1 | 190 | 5 | 210 | 20 |
| Comparative example 1 | — | — | 210 | 10 |
| 2 | 190 | 10 | 210-230 | 20 |
| Comparative example 2 | — | — | — | — |

| Example | M calculated [g/mol] | $M_n$ determined [g/mol] | $M_w$ determined [g/mol] | PI | max. force [N] |
|---|---|---|---|---|---|
| 1 | 22 765 | 19 564 | 59 025 | 3.0 | 13 943 |
| Comparative example 1 | 22 765 | 9326 | 41 160 | 4.4 | 7195 |
| 2 | 54 894 | 18 566 | 59 444 | 3.2 | 13 059 |
| Comparative example 2 | 54 894 | 5391 | 18 724 | 3.5 | 14 742 |

The comparison between examples and comparative examples unambiguously proves that polymers having a higher molecular weight, both $M_n$ and $M_w$, and also lower polydispersity can be prepared with the chosen process using temperature gradients.

CITED LITERATURE

DE 10 2014 226 838 A[1]
WO 2015/173111 A[1]
WO 2015/173110 A[1], US 2014/0121299
WO 2014/076024 A[1]
PCT/EP2018/053612
DE 102 02 838 A[1]
Angew. Chem. 2000, 112, pp 3926-3945

The invention claimed is:

1. A process for preparing a thermoplastic polymer, the process comprising reacting at least components (i) to (ii)
   i) a polyisocyanate composition comprising a diisocyanate;
   ii) an epoxide composition comprising a diepoxide,
   in the presence of a catalyst composition (iii)
   wherein the process comprises:
   a) initially charging the epoxide composition (ii) and the catalyst composition (iii) as a mixture at a temperature in a first temperature range ($T_1$);
   b) at least partially adding the polyisocyanate composition (i) while maintaining a temperature in the first temperature range $T_1$;
   c) raising the temperature to a temperature in a final temperature range ($T_f$);
   d) adding any remaining polyisocyanate composition (i) in the final temperature range.

2. The process of claim 1, wherein the final temperature range $T_f$ comprises a second temperature range $T_2$ and a third temperature range $T_3$,
   wherein the third temperature range $T_3$ is above the second temperature range $T_2$,
   and wherein the second temperature range $T_2$ is above the first temperature range $T_1$.

3. The process of claim 1, wherein the first temperature range $T_1$ is 140 to 180° C.

4. The process of claim 1, wherein the final temperature range $T_f$ is >180 to 250° C., and
   wherein the third temperature range $T_3$ is >200 to 250° C.

5. The process of claim 1, wherein in the first temperature range $T_1$ in the adding (b) 80% to 95% by weight of the polyisocyanate composition (i), based on a total amount of the polyisocyanate composition (i), is added.

6. The process of claim 1, wherein, in the final temperature range $T_f$, 5% to 20% by weight of the polyisocyanate composition (i), based on a total amount of the polyisocyanate composition (i), is added.

7. The process of claim 1, wherein the catalyst composition (iii) comprises an ionic liquid.

8. The process of claim 1, wherein amounts of the polyisocyanate composition (i), epoxide composition (ii), and catalyst composition (iii) constitute 95% by weight, of a total reaction amount of all substances present.

9. A thermoplastic polymer, obtained by the process of claim 1.

10. A thermoplastic polymer, obtained by a process comprising reacting at least components (i) to (ii)
   i) a polyisocyanate composition comprising a diisocyanate;
   ii) an epoxide composition comprising a diepoxide;
   in the presence of a catalyst composition (iii),
   wherein the process comprises:
   (a) initially charging the epoxide composition (ii) and the catalyst composition (iii) as a mixture at a temperature in a first temperature range ($T_1$);
   (b) at least partially adding the polyisocyanate composition (i) while maintaining a first temperature;
   (c) raising the temperature to a temperature in a final temperature range ($T_f$);
   (d) adding any remaining polyisocyanate composition (i) in the final temperature range,
   to obtain the thermoplastic polymer.

11. The thermoplastic polymer of claim 10, wherein the catalyst composition (iii) comprises an ionic liquid.

12. The thermoplastic polymer of claim 10, wherein amounts of the polyisocyanate composition (i), epoxide composition (ii) and catalyst composition (iii) constitute 95% by weight, of a total reaction amount of all substances present.

13. The thermoplastic polymer of claim 10, having a number-average molar mass $M_n$ of greater than 10 000 g/mol.

14. The thermoplastic polymer of claim 10, having a polydispersity of less than 4,
   wherein the polydispersity PI is the quotient of the weight-average molar mass $M_w$ and the number-average molar mass $M_n$ of the thermoplastic polymer.

15. A fiber or a shaped body or thermoplastic material modifier, comprising:
   the thermoplastic polymer of claim 10,
   wherein the fiber or body is injection molded, calendered, powder sintered, laser sintered, melt pressed, or extruded.

16. The process of claim 1, wherein the first temperature range $T_1$ is 150 to 170° C.

17. The process of claim 1, wherein the first temperature range $T_1$ is 155 to 165° C.

18. The process of claim 1, wherein the final temperature range $T_f$ is >170 to 250° C.,
   wherein the second temperature range $T_2$ is >180 to 200° C., and
   wherein the third temperature range $T_3$ is >200 to 230° C.

19. The thermoplastic polymer of claim 10, having a number-average molar mass $M_n$ of greater than 18,000 g/mol.

20. The thermoplastic polymer of claim 19, having a polydispersity of less than 3.5, wherein the polydispersity PI is the quotient of the weight-average molar mass $M_w$ and the number-average molar mass $M_n$ of the thermoplastic polymer.

21. The thermoplastic polymer of claim 9, having a number-average molar mass $M_n$ of greater than 18,000 g/mol.

22. The thermoplastic polymer of claim 21, having a polydispersity of less than 3.5, wherein the polydispersity PI is the quotient of the weight-average molar mass $M_w$ and the number-average molar mass $M_n$ of the thermoplastic polymer.

* * * * *